United States Patent
Duan et al.

(10) Patent No.: US 10,333,690 B1
(45) Date of Patent: Jun. 25, 2019

(54) CALIBRATION PATTERN AND DUTY-CYCLE DISTORTION CORRECTION FOR CLOCK DATA RECOVERY IN A MULTI-WIRE, MULTI-PHASE INTERFACE

(71) Applicant: QUALCOMM Incorporated, San Diego, CA (US)

(72) Inventors: Ying Duan, San Diego, CA (US); Abhay Dixit, San Diego, CA (US); Shih-Wei Chou, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/971,016

(22) Filed: May 4, 2018

(51) Int. Cl.
*H04L 7/033* (2006.01)
*H04L 7/00* (2006.01)
*G09G 5/00* (2006.01)
*H04L 25/49* (2006.01)

(52) U.S. Cl.
CPC ........... *H04L 7/0041* (2013.01); *G09G 5/008* (2013.01); *H04L 7/0037* (2013.01); *H04L 7/0091* (2013.01); *H04L 7/033* (2013.01); *H04L 25/49* (2013.01)

(58) Field of Classification Search
CPC ..... H04L 7/0041; H04L 7/033; H04L 7/0091; H04L 7/0037; H04L 25/49; H04L 25/0264; H04B 3/462; G09G 5/008
USPC ................................................. 375/220, 224
See application file for complete search history.

(56) References Cited

U.S. PATENT DOCUMENTS

| 5,325,048 | A | 6/1994 | Longini et al. |
| 7,149,265 | B2 | 12/2006 | Wang et al. |
| 7,916,780 | B2 | 3/2011 | Lee |
| 8,433,022 | B2 | 4/2013 | Onodera |

(Continued)

FOREIGN PATENT DOCUMENTS

| JP | 2017112427 A | 6/2017 |
| WO | WO-2016007218 A1 | 1/2016 |
| WO | WO-2017145585 A1 | 8/2017 |

OTHER PUBLICATIONS

MT41J512M4., et al., "DDR3 SDRAW," Mar. 3, 2016 (Mar. 3, 2016), XP055410563, URL:https://www.micron.com/-/media/documents/products/data-sheet/dram/ddr3/2gb_ddr3_sdram.pdf, pp. 1-215.

*Primary Examiner* — Kevin Kim
(74) *Attorney, Agent, or Firm* — Loza & Loza, LLP/Qualcomm

(57) ABSTRACT

Methods, apparatus, and systems for calibration and correction of data communications over a multi-wire, multi-phase interface are disclosed. In particular, calibration is provided for data communication devices coupled to a 3-line interface. The calibration includes generating and transmitting a calibration pattern on the 3-line interface, where the generation of the pattern includes toggling two of three interface lines from one voltage level to another voltage level over a predetermined time interval. Furthermore, the generation of the pattern includes maintaining a remaining third interface line at a common mode voltage level over the predetermined time interval, wherein only a single transition occurs for the predetermined time interval. Calibration data may then be derived in a receiver device using the transmitted calibration pattern.

30 Claims, 19 Drawing Sheets

(56) References Cited

U.S. PATENT DOCUMENTS

| | | |
|---|---|---|
| 9,246,666 B2 | 1/2016 | Kil |
| 9,473,291 B2 | 10/2016 | Kil et al. |
| 9,485,080 B1 | 11/2016 | Duan et al. |
| 9,525,543 B2 | 12/2016 | Liu et al. |
| 9,537,617 B2 | 1/2017 | Chandrasekaran et al. |
| 9,553,635 B1 | 1/2017 | Sejpal et al. |
| 9,735,950 B1 | 8/2017 | Liu et al. |
| 9,866,413 B2 | 1/2018 | Chang |
| 2003/0043926 A1 | 3/2003 | Terashima et al. |
| 2010/0027706 A1 | 2/2010 | Tanimoto et al. |
| 2011/0304340 A1 | 12/2011 | Hall et al. |
| 2014/0348214 A1 | 11/2014 | Sengoku et al. |
| 2015/0030112 A1 | 1/2015 | Wiley et al. |
| 2017/0032757 A1 | 2/2017 | Itoigawa et al. |
| 2017/0126444 A1* | 5/2017 | Chang .................. H04L 25/493 |
| 2017/0264379 A1 | 9/2017 | Wiley |
| 2018/0062883 A1 | 3/2018 | Duan et al. |
| 2018/0131503 A1 | 5/2018 | Duan et al. |
| 2018/0152282 A1* | 5/2018 | Choi ..................... H03K 5/133 |
| 2018/0323953 A1* | 11/2018 | Chiueh ................ H04L 7/0041 |

\* cited by examiner

CALIBRATION PATTERN AND DUTY-CYCLE DISTORTION CORRECTION FOR CLOCK DATA RECOVERY IN A MULTI-WIRE, MULTI-PHASE INTERFACE

TECHNICAL FIELD

The present disclosure relates generally to high-speed data communications interfaces, and more particularly, to clock generation in a receiver coupled to a multi-wire, multi-phase data communication link.

INTRODUCTION

Manufacturers of mobile devices, such as cellular phones, may obtain components of the mobile devices from various sources, including different manufacturers. For example, an application processor in a cellular phone may be obtained from one manufacturer, while an imaging device or camera may be obtained from another manufacturer, and a display may be obtained from yet another manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by MIPI. Further, a multiphase, multi-wire physical layer standard MIPI C-PHY may be utilized to provide high throughput performance over bandwidth-limited channels for connecting displays and cameras to the application processor.

In particular, the multiphase, multi-wire (C-PHY) interface defined by the MIPI Alliance uses three wires or conductors to transmit information between devices. Each of the three wires may be in one of three signaling states during transmission of a symbol over the C-PHY interface. Clock information is encoded in a sequence of symbols transmitted on the C-PHY interface and a receiver (RX) generates a clock signal from transitions between consecutive symbols. The maximum speed of the C-PHY interface and the ability of a clock and data recovery (CDR) circuit to recover clock information may be limited by the maximum time variation related to transitions of signals transmitted on the different wires of the communication link. A receiver may employ delay circuits to ensure that all of the conductors have assumed a stable signaling state before providing a sampling edge. The transmission rate of the link may be limited by the delay values used, and there is an ongoing need for clock generation circuits that can function reliably as signaling frequencies of multi-wire interfaces increase.

In order to support a higher data rate in a three-level signaling system, the calibration/training for CDR becomes significant, especially in the situation where the channel condition gets worse as the length is extended to support multiple applications. The delay between each wire may be attempted to be controlled over the same chip resulting in a close timing for the CDR. Hence, improved calibration is desired.

SUMMARY

Embodiments disclosed herein provide systems, methods and apparatus that enable improved communications on a multi-wire and/or multiphase communications link. The communications link may be deployed in apparatus such as a mobile terminal having multiple Integrated Circuit (IC) devices.

In an aspect of the disclosure, a method for providing calibration in data communication devices coupled to a 3-line interface is disclosed. The method includes generating and transmitting a calibration pattern on the 3-line interface, where the generation of the pattern includes toggling two of three interface lines from one voltage level to another voltage level over a predetermined time interval. Furthermore, the generation of the pattern includes maintaining a remaining third interface line at a common mode voltage level over the predetermined time interval, wherein only a single transition occurs for the predetermined time interval. Additionally, the method includes deriving calibration data based on the transmitted calibration pattern.

According to further aspects, an apparatus for providing calibration on a 3-wire, 3-phase interface is disclosed. The apparatus includes means for generating and transmitting a calibration pattern on the 3-wire interface, wherein the means for generation the pattern includes means for toggling two of three interface wires from one voltage level to another voltage level over a predetermined time interval, and means for maintaining a remaining third interface line at a common mode voltage level over the unit interval time period, wherein only a single transition occurs for the predetermined time interval.

In yet another aspect, a processor readable storage medium is disclosed. The medium includes code for generating and transmitting a calibration pattern on a 3-line interface, the generation of the pattern comprising toggling two of three interface lines from one voltage level to another voltage level over a predetermined time interval; and maintaining a remaining third interface line at a common mode voltage level over the unit interval time period, wherein only a single transition occurs for the predetermined time interval.

In still another aspect, a system for data communication is disclosed. The system includes a calibration pattern determination circuitry in a transmitter, the calibration pattern determination circuitry is configured to generate a calibration pattern on a 3-line interface. The generation of the pattern includes toggling two of three interface lines from one voltage level to another voltage level over a predetermined time interval, and maintaining a remaining third interface line at a common mode voltage level over the predetermined time interval, wherein only a single transition occurs for the predetermined time interval. The system also includes a calibration data determination circuity in a receiver coupled to the 3-line interface, the calibration data determination circuity configured to derive calibration data based on the transmitted calibration pattern.

DETAILED DESCRIPTION

Figure 1:
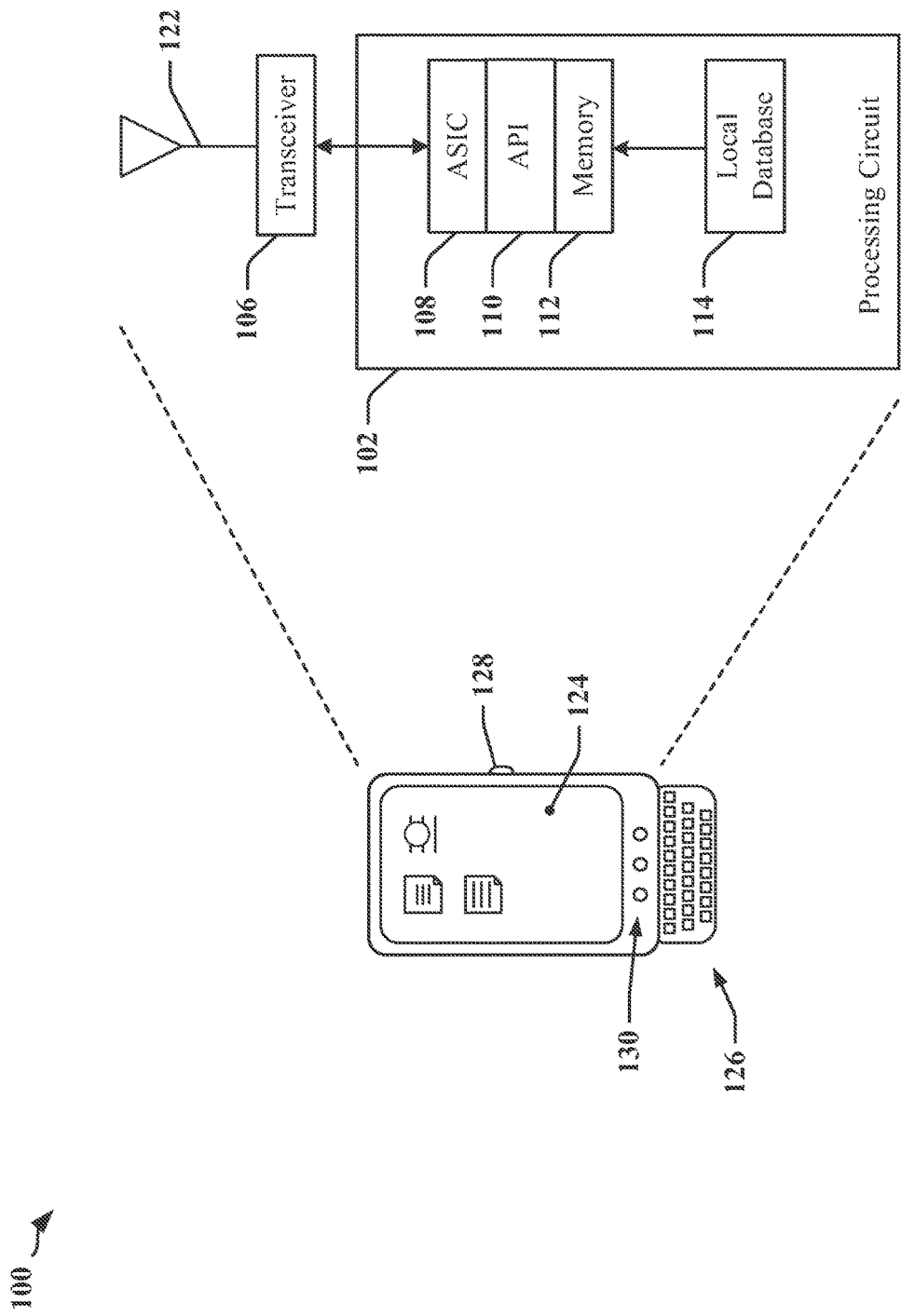
FIG. 1 depicts an apparatus employing a data link between IC devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview of C-PHY Interface

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or trio of wires. The three-phase signal is transmitted on each wire of the trio in different phases. Each three-wire trio provides a lane on a communications link A symbol interval may be defined as the interval of time in which a single symbol controls the signaling state of a trio. In each symbol interval, one wire is "undriven" while the remaining two of the three wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +V/2. Different symbols are transmitted in each consecutively transmitted pair of symbols, and different pairs of wires may be differentially driven in different symbol intervals.

FIG. 1 depicts an example of apparatus 100 that may employ a C-PHY 3-phase communication link. The apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as memory devices 112 that may include processor-readable devices that store and maintain data and instructions for execution or for other use by the processing circuit 102 and devices, and/or memory cards that support a display 124. The processing circuit 102 may be controlled by one or more of an operating system and an application programming interface (API) 110 layer that supports and enables execution of software modules residing in storage media, such as the memory device 112 of the wireless device. The memory devices 112 may include read-only memory (ROM), dynamic random-access memory (DRAM), one or more types of programmable read-only memory (PROM), flash cards, or any memory type that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, electrically-erasable PROM (EEPROM), optical media, tape, soft or hard disk, or the like. The processing circuit may also be operably coupled to external devices such as an antenna 122, the display 124, operator controls, such as a button 128 and a keypad 126 among other components.

Figure 2:
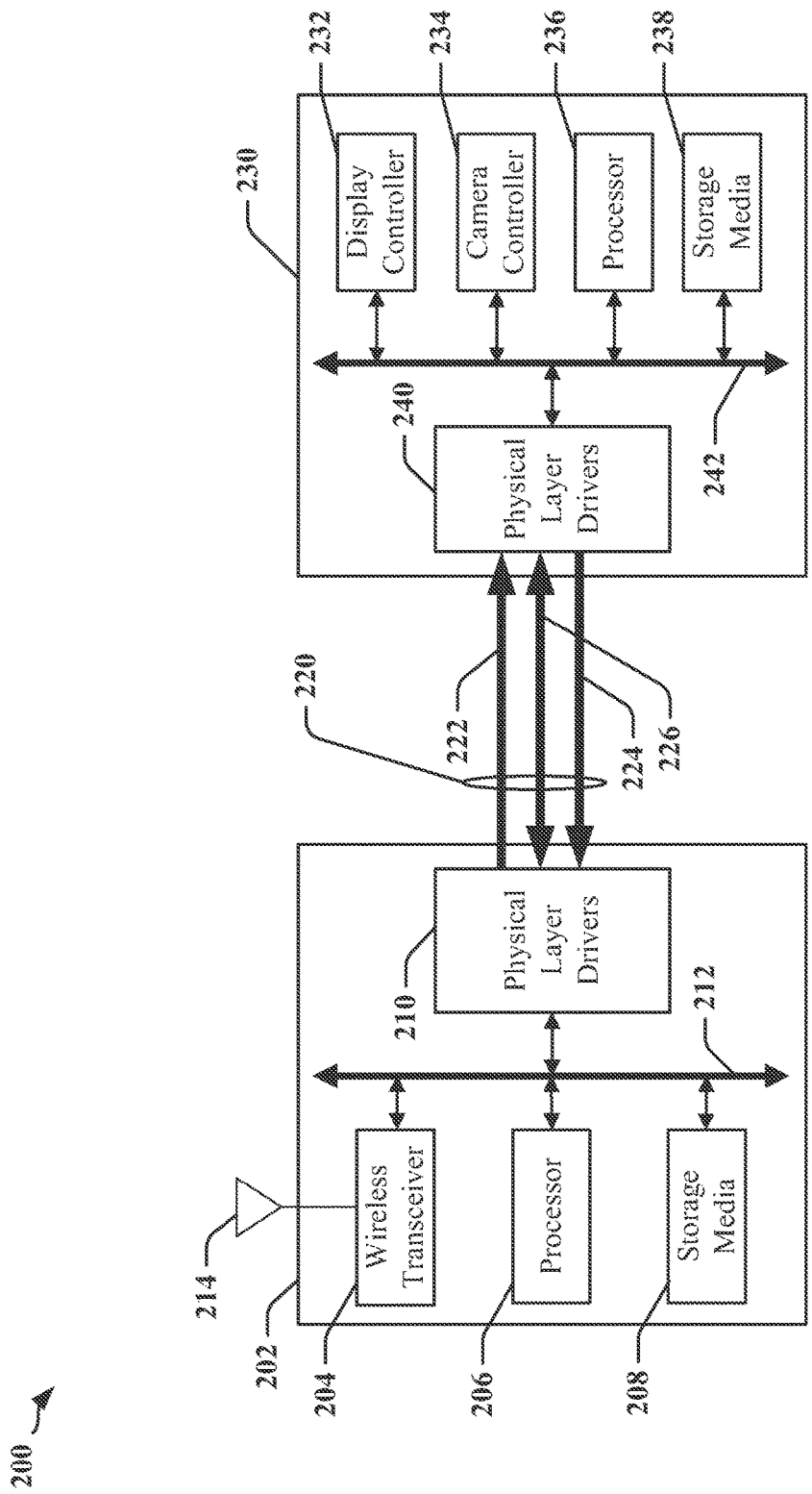
FIG. 2 illustrates a system architecture for an apparatus employing a data link between IC devices that selectively operates according to one of plurality of available standards.

FIG. 2 is a block schematic illustrating certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first communications channel 222 may be referred to as a forward channel 222 while a second communications channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communications channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including establishing and maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators, and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
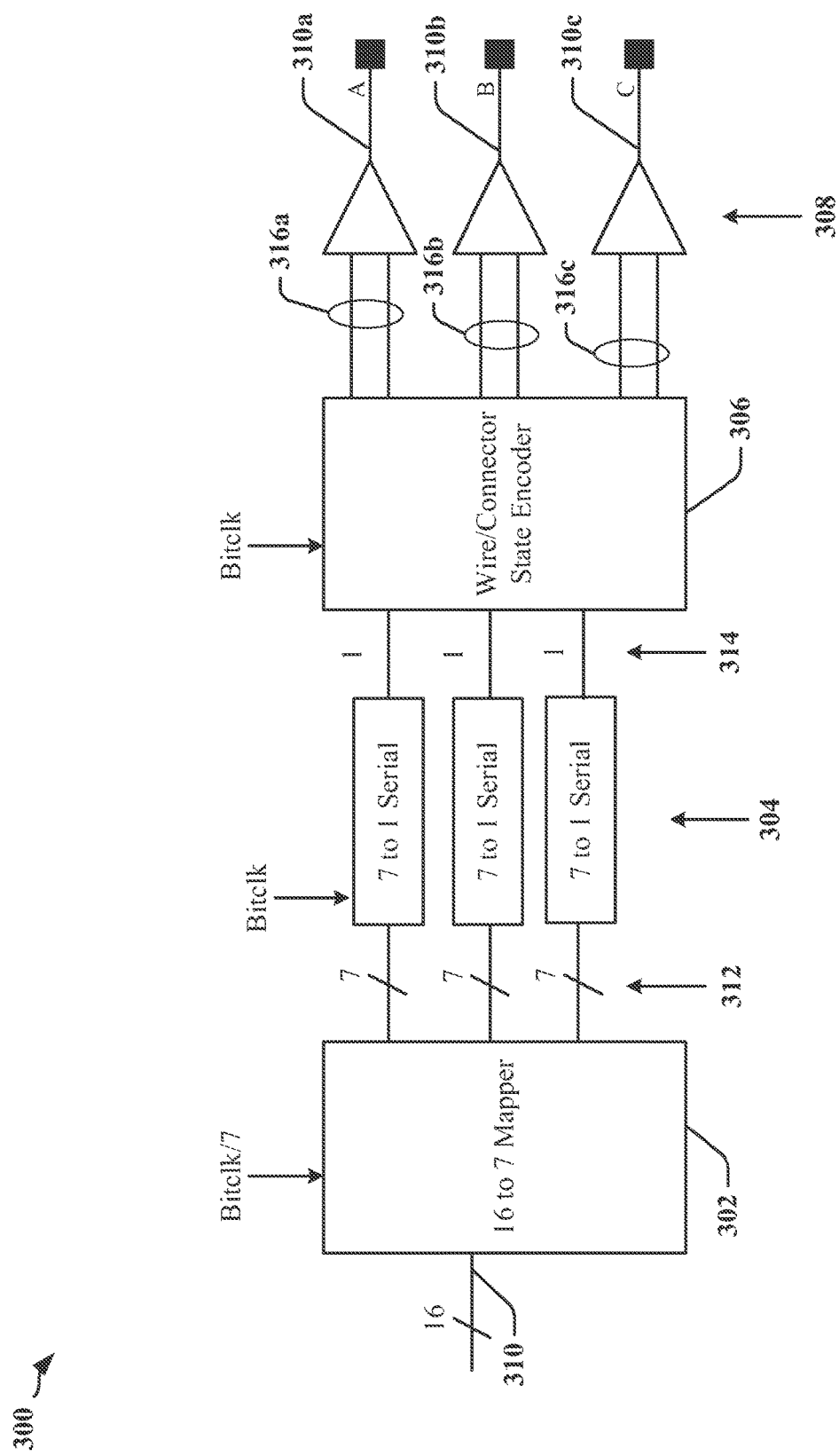
FIG. 3 illustrates a C-PHY 3-phase data encoder.

FIG. 3 is a schematic diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to attain a voltage level that lies substantially halfway between positive and negative voltage levels provided on driven signal wires 310a, 310b and/or 310c. Typically, there is no significant current flow through an undriven signal wire 310a, 310b or 310c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 310a, 310b and 310c. The drivers 308 may be implemented as unit-level current-mode or voltage-mode drivers. In one example, each driver 308 may receive sets of two or more of signals 316a, 316b and 316c that determine the output state of corresponding signal wires 310a, 310b and 310c. In one example, the sets of two signals 316a, 316b and 316c may include a pull-up signal (PU signal) and a pull-down signal (PD signal) that, when high, activate pull-up and pull-down circuits that drive the signal wires 310a, 310b and 310c toward a higher level or lower level voltage, respectively. In this example, when both the PU signal and the PD signal are low, the signal wires 310a, 310b and 310c may be terminated to a mid-level voltage.

For each transmitted symbol interval in an M-wire, N-phase polarity encoding scheme, at least one signal wire 310a, 310b or 310c is in the midlevel/undriven (0) voltage or current state, while the number of positively driven (+1 voltage or current state) signal wires 310a, 310b or 310c is equal to the number of negatively driven (−1 voltage or current state) signal wires 310a, 310b or 310c, such that the sum of current flowing to the receiver is always zero. For each symbol, the state of at least one signal wire 310a, 310b or 310c is changed from the symbol transmitted in the preceding transmission interval.

In operation, a mapper 302 may receive and map 16-bit data 310 to 7 symbols 312. In the 3-wire example, each of the 7 symbols defines the states of the signal wires 310a, 310b and 310c for one symbol interval. The 7 symbols 312 may be serialized using parallel-to-serial converters 304 that provide a timed sequence of symbols 314 for each signal wire 310a, 310b and 310c. The sequence of symbols 314 is typically timed using a transmission clock. A 3-wire 3-phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols where the bits per symbol is not an integer. In the example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2 (5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
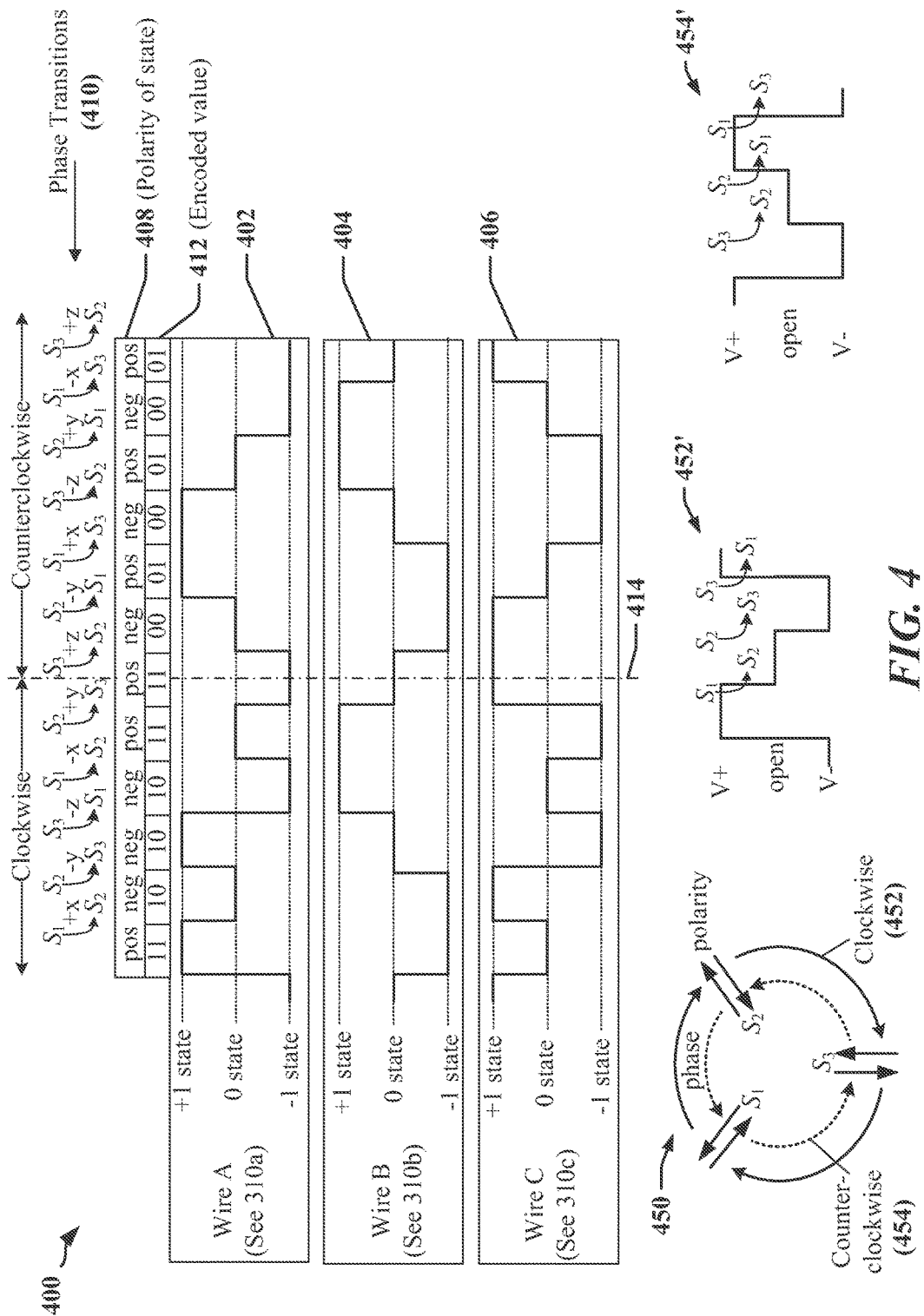
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 454' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 310a, 310b and 310c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 310a, 310b and 310c is in a different signaling states than the other wires. When more than 3 signal wires 310a, 310b and 310c are used in a 3-phase encoding system, two or more signal wires 310a, 310b and/or 310c can be in the same signaling state at each signaling interval, although each state is present on at least one signal wire 310a, 310b and/or 310c in every signaling interval.

Information may be encoded in the direction of rotation at each phase transition 410, and the 3-phase signal may change direction for each signaling state. Direction of rotation may be determined by considering which signal wires 310a, 310b and/or 310c are in the '0' state before and after a phase transition, because the undriven signal wire 310a, 310b and/or 310c changes at every signaling state in a rotating three-phase signal, regardless of the direction of rotation.

The encoding scheme may also encode information in the polarity 408 of the two conductors 310a, 310b and/or 310c that are actively driven. At any time in a 3-wire implementation, exactly two of the conductors 310a, 310b, and 310c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 310a, 310b and 310c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| ABCD | ABCE | ABCF | ABDE | ABDF |
|------|------|------|------|------|
| ABEF | ACDE | ACDF | ACEF | ADEF |
| BCDE | BCDF | BCEF | BDEF | CDEF |

Of the 4 wires driven, the possible combinations of two wires driven positive (and the other two must be negative). The combinations of polarity may include:

| ++-- | +--+ | +-+- | -+-+ | -++- | --++ |
|------|------|------|------|------|------|

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

one equation for calculating the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The equivalent number of bits per symbol may be stated as:

$$\log_2\left(C(N_{wires}, N_{driven}) \cdot C\left(N_{driven}, \frac{N_{driven}}{2}\right) - 1\right)$$

Figure 5:
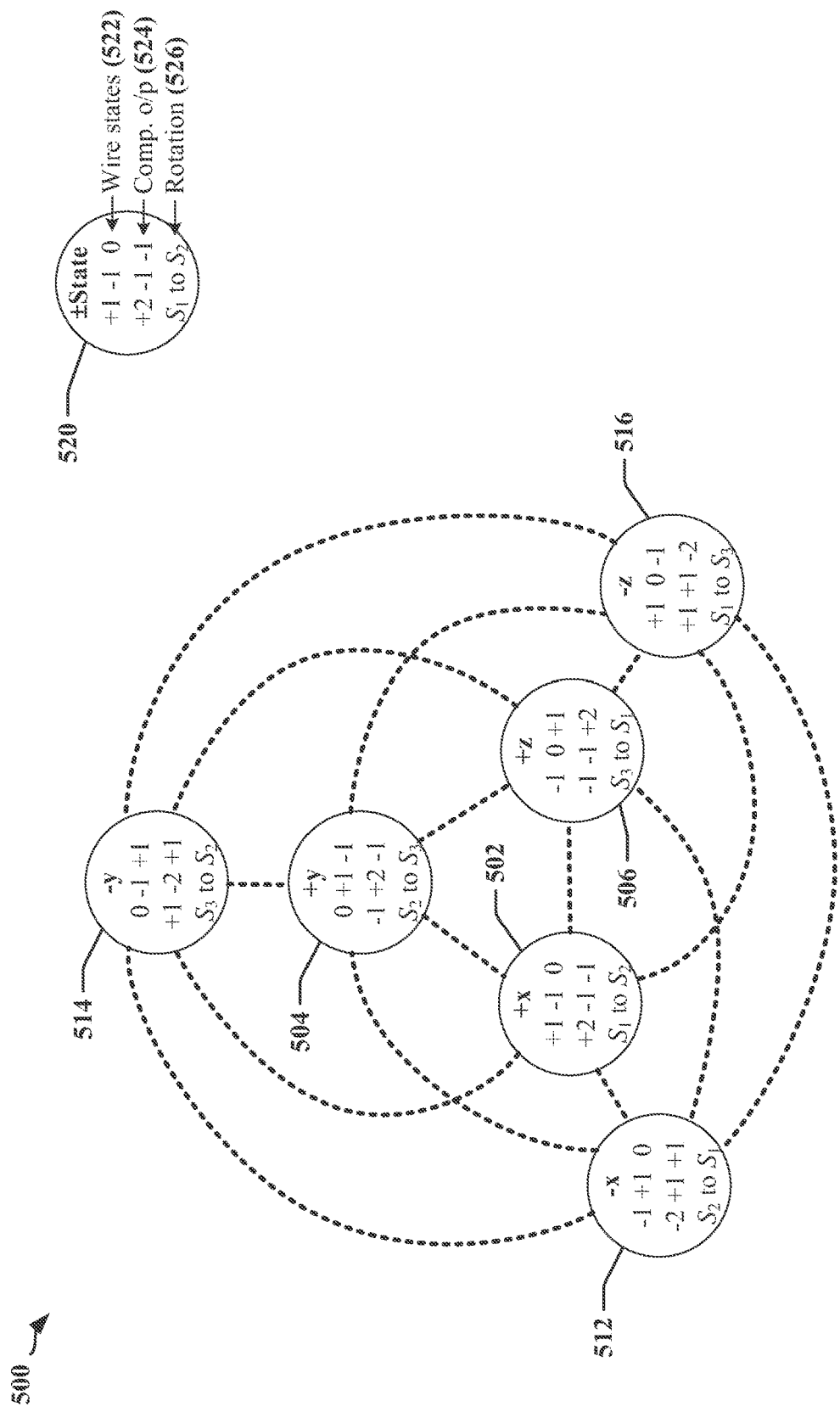
FIG. 5 is a state diagram illustrating potential state transitions in a C-PHY 3-phase encoded interface.

FIG. 5 is a state diagram 500 illustrating 6 states and 30 possible state transitions in one example of a 3-wire, 3-phase communication link. The possible states 502, 504, 506, 512, 514 and 516 in the state diagram 500 include and expand on the states shown in the circular state diagram 450 of FIG. 4. As shown in the exemplar of a state element 520, each state 502, 504, 506, 512, 514 and 516 in the state diagram 500 includes a field 522 showing the voltage state of signals A, B and C (transmitted on signal wires 310a, 310b and 310c respectively), a field 524 showing the result of a subtraction of wire voltages by differential receivers (see the differential amplifiers/receivers 602 of FIG. 6, for example), respectively and a field 526 indicating the direction of rotation. For example, in state 502 (+x) wire A=+1, wire B=−1 and wire C=0, yielding output of differential receiver 702a (A−B)=+2, differential receiver 702b (B−C)=−1 and differential receiver 702c (C−A)=+1. As illustrated by the state diagram, transition decisions taken by phase change detect circuitry in a receiver are based on 5 possible levels produced by differential receivers, which include −2, −1, 0, +1 and +2 voltage states.

Figure 6:
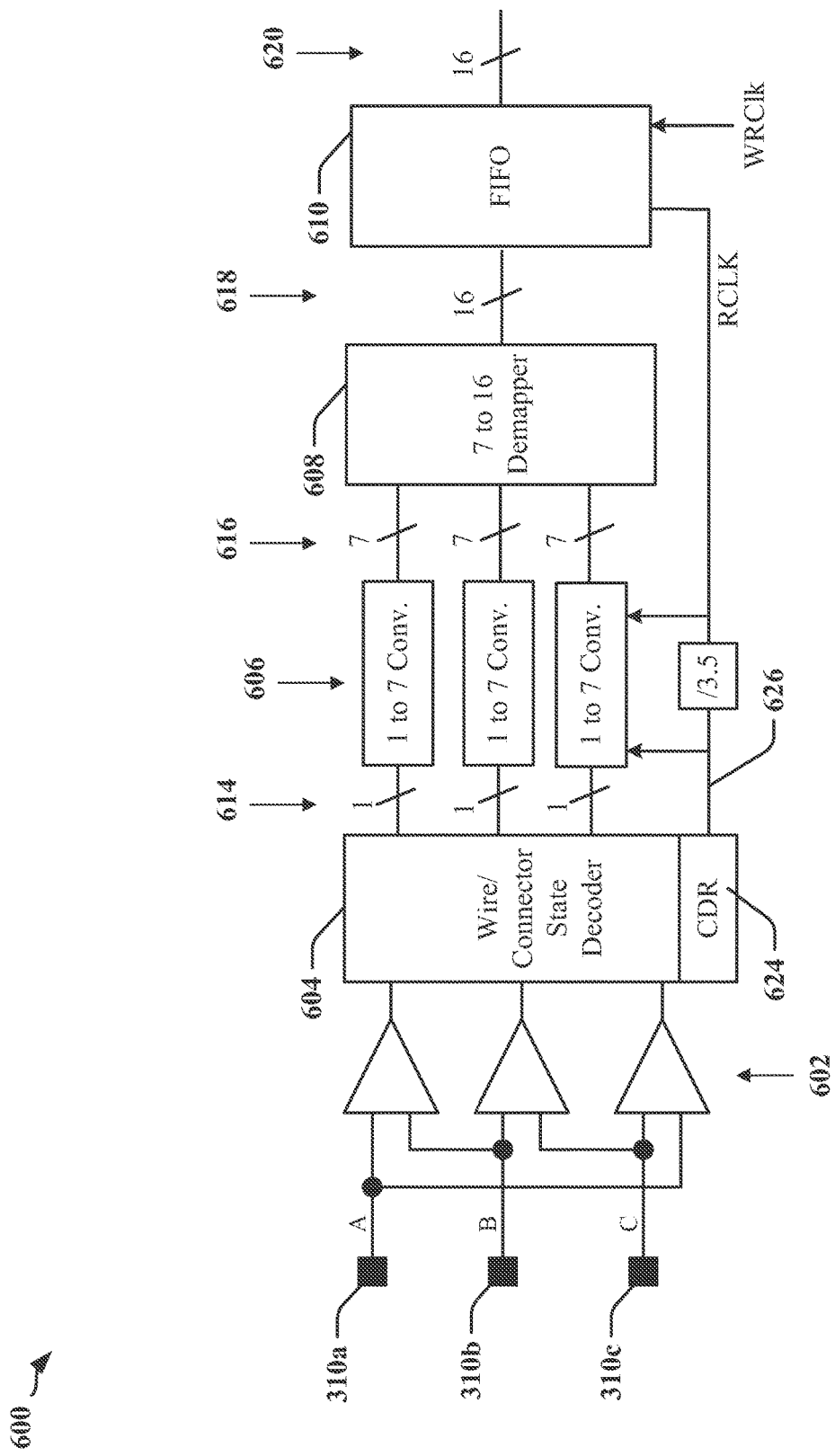
FIG. 6 illustrates a C-PHY 3-phase decoder.

FIG. 6 is a diagram illustrating certain aspects of a 3-wire, 3-phase decoder 600. Differential receivers 602 and a wire state decoder 604 are configured to provide a digital representation of the state of the three transmission lines (e.g., the signal wires 310a, 310b and 310c illustrated in FIG. 3), with respect to one another, and to detect changes in the state of the three transmission lines compared to the state transmitted in the previous symbol period. Seven consecutive states are assembled by the serial-to-parallel convertors 606 to obtain a set of 7 symbols to be processed by the demapper 608. The demapper 608 produces 16 bits of data that may be buffered in a first-in-first-out (FIFO) register 610.

The wire state decoder 604 may extract a sequence of symbols 614 from phase encoded signals received on the signal wires 310a, 310b and 310c. The symbols 614 are encoded as a combination of phase rotation and polarity as disclosed herein. The wire state decoder may include a CDR circuit 624 that extracts a recovered clock 626 (RCLK) that can be used to reliably capture symbols from the signal wires 310a, 310b and 310c. A transition occurs on least one of the signal wires 310a, 310b and 310c at each symbol boundary and the CDR circuit 624 may be configured to generate the clock 626 based on the occurrence of a transition or multiple transitions. An edge of the clock may be delayed to allow time for all signal wires 310a, 310b and 310c to have stabilized and to thereby ensure that the current symbol is captured for decoding purposes.

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
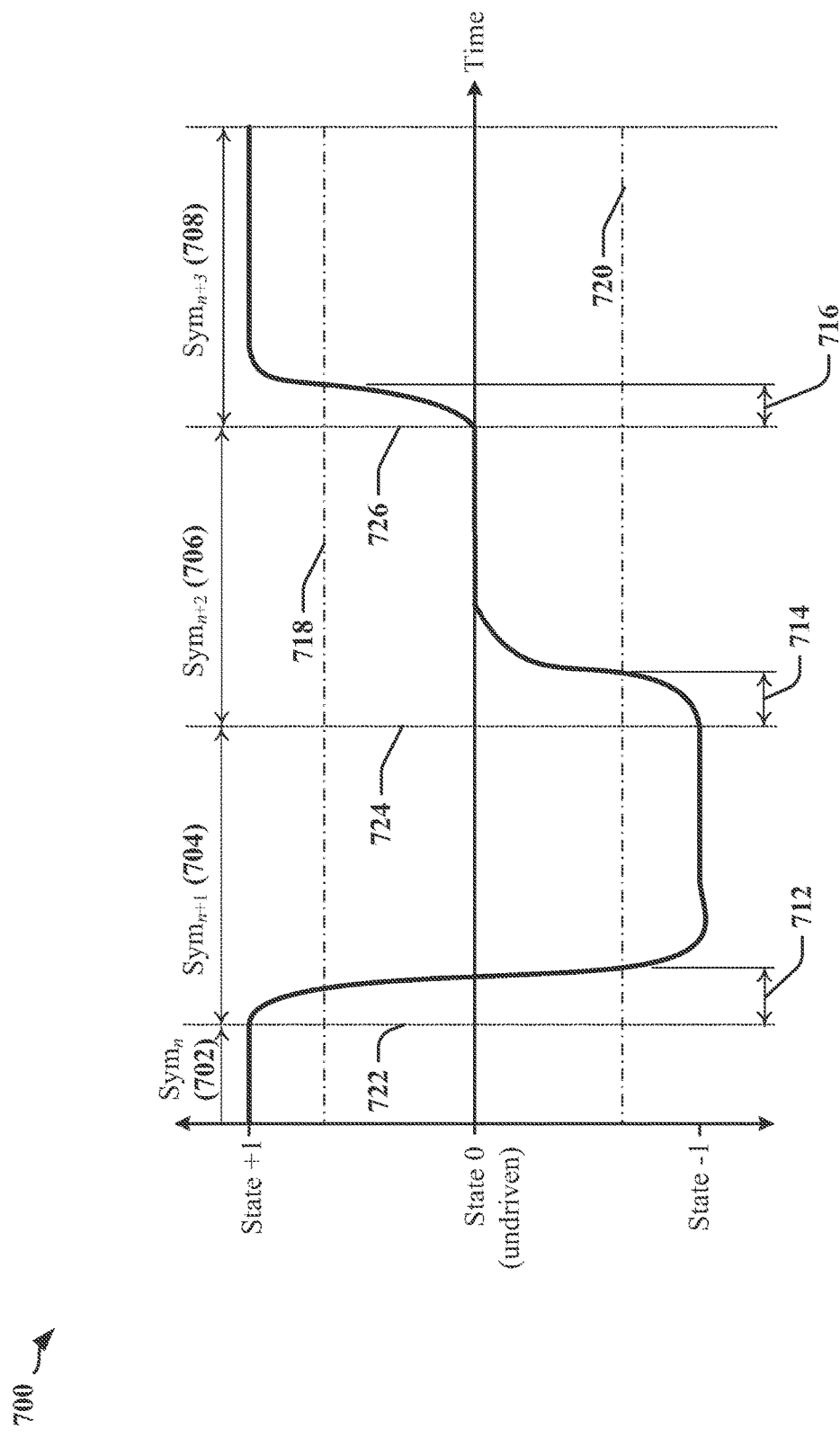
FIG. 7 is an example of the effects of signal rise times on transition detection in a C-PHY decoder.

FIG. 7 is an exemplary timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 310a, 310b or 310c. A first symbol $Sym_n$ 702 is transmitted in a first symbol interval that ends at a time 722 when a second symbol $Sym_{n+1}$ 724 is transmitted in a second symbol interval. The second symbol interval may end at time 726 when a third symbol $Sym_{n+2}$ 706 is transmitted in the third symbol interval, which ends when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 310a, 310b or 310c to reach a threshold voltage 718 and/or 720. The threshold voltages may be used to determine the state of the signal wire 310a, 310b or 310c. The transition from a state determined by the second symbol 704 to the state for the third symbol 706 may be detectable after a delay 714 attributable to the time taken for voltage in the signal wire 310a, 310b or 310c to reach one of the threshold voltages 718 and/or 720. The transition from a state determined by the third symbol 706 to the state for the fourth symbol 708 may be detectable after a delay 716 attributable to the time taken for voltage in the signal wire 310a, 310b or 310c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
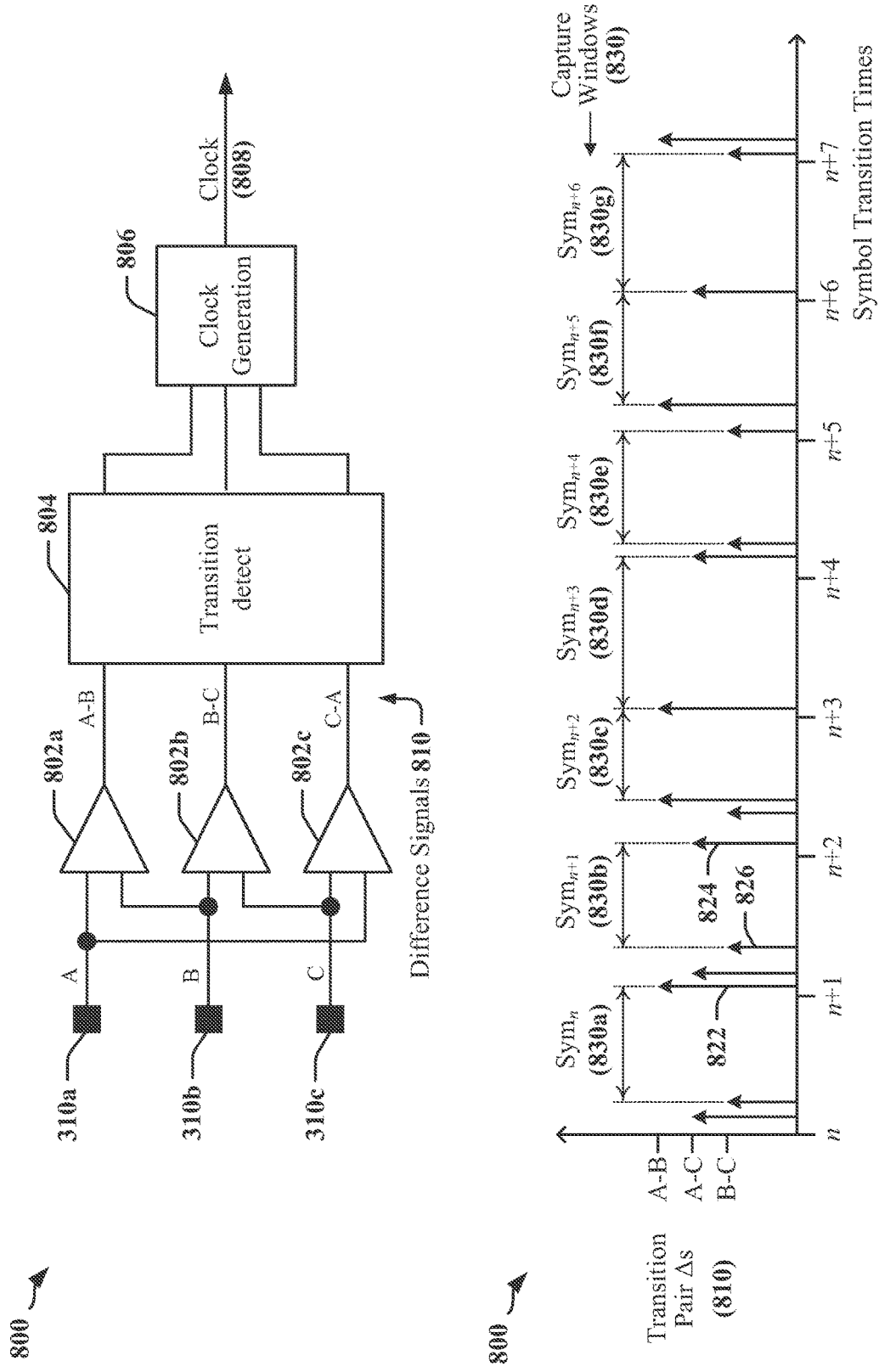
FIG. 8 illustrates transition detection in a C-PHY decoder.

FIG. 8 includes a block schematic 800 illustrating certain aspects of CDR circuits that may be provided in a receiver in a C-PHY 3-phase interface. A set of differential receivers 802a, 802b and 802c is configured to generate a set of difference signals 810 by comparing each of the three signal wires 310a, 310b and 310c in a trio with the other of the three signal wires 310a, 310b and 310c in the trio. In the example depicted, a first differential receiver 802a compares the states of signal wires 310a and 310b, a second differential receiver 802b compares the states of signal wires 310b and 310c and a third differential receiver 802c compares the states of signal wires 310a and 310c. Accordingly, a transition detection circuit 804 can be configured to detect occurrence of a phase change because the output of at least one of the differential receivers 802a, 802b and 802c changes at the end of each symbol interval.

Certain transitions between transmitted symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. In another example, both wires in a pair of signal wires 310a, 310b and/or 310c may be in the same state in a first time interval and both wires may be in a same second state in a second time interval and the corresponding differential receiver 802a, 802b or 802c may be unchanged after the phase transition. Accordingly, a clock generation circuit 806 may include a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires may be detected at different times for different combinations of the signal wires 310a, 310b and/or 310c. The timing of detection of signaling state changes may vary according to the type of signaling state change that has occurred. The result of such variability is illustrated in the timing chart 850 of FIG. 8. Markers 822, 824 and 826 represent occurrences of transitions in the difference signals 810 provided to the transition detection circuit 804. The markers 822, 824 and 826 are assigned different heights in the timing chart 850 for clarity of illustration only, and the relative heights of the markers 822, 824 and 826 are not intended to show a specific relationship to voltage or current levels, polarity or weighting values used for clock generation or data decoding. The timing chart 850 illustrates the effect of timing of transitions associated with symbols transmitted in phase and polarity on the three signal wires 310a, 310b and 310c. In the timing chart 850, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

The throughput of a C-PHY communications link may be affected by duration and variability in signal transition times. For example, variability in detection circuits may be caused by manufacturing process tolerances, variations and stability of voltage and current sources and operating temperature, as well as by the electrical characteristics of the signal wires 310a, 310b and 310c. The variability in detection circuits may limit channel bandwidth.

Figure 9:
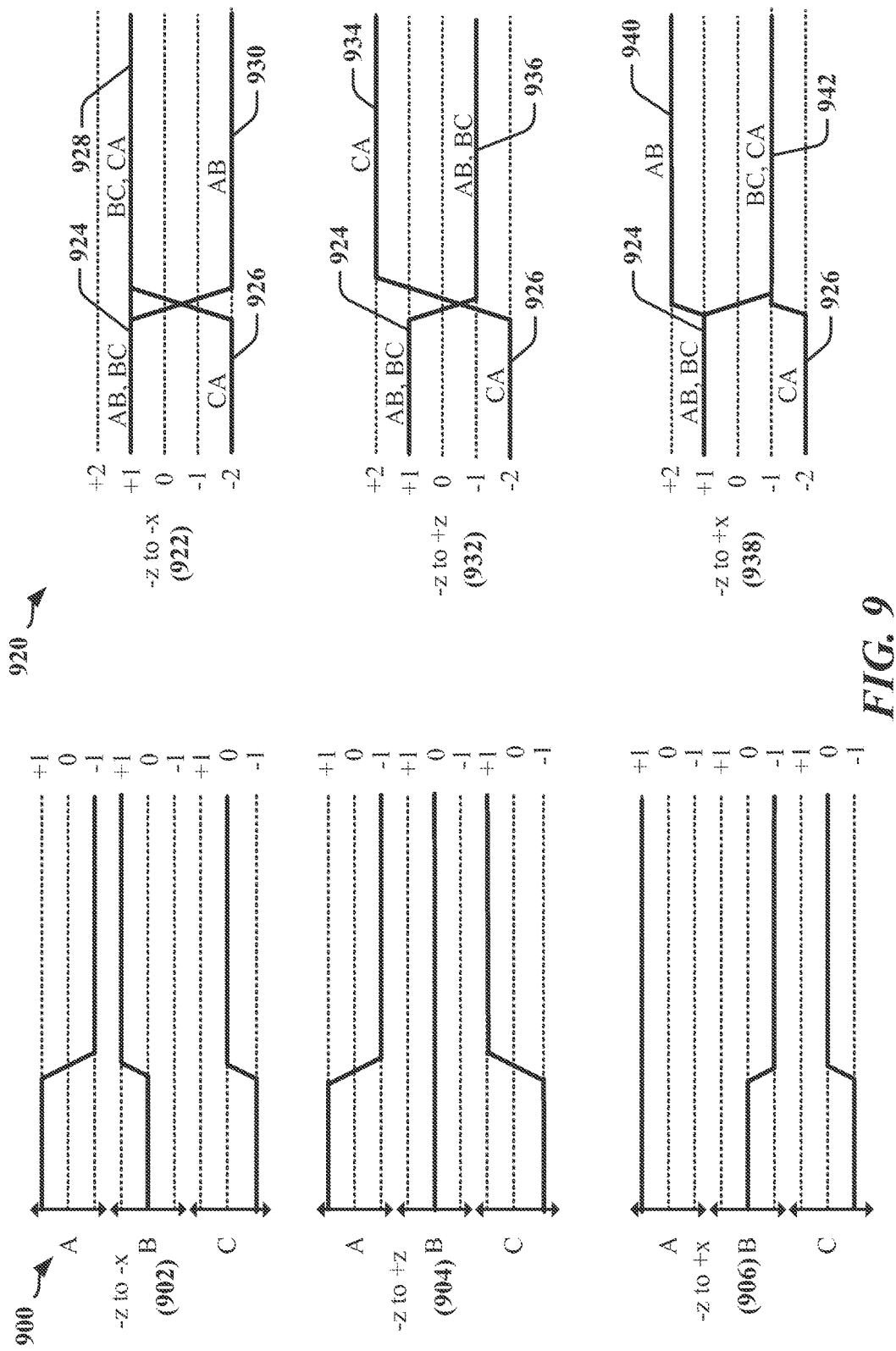
FIG. 9 illustrates one example of signal transitions occurring between pairs of consecutive symbols transmitted on a C-PHY interface.

FIG. 9 includes timing charts 900 and 920 representative of certain examples of transitions from a first signaling state to a second signaling state between certain consecutive symbols. The signaling state transitions illustrated in the timing charts 900 and 920 are selected for illustrative purposes, and other transitions and combinations of transitions can occur in a C-PHY interface. The timing charts 900 and 920 relate to an example of a 3-wire, 3-phase communications link, in which multiple receiver output transitions may occur at each symbol interval boundary due to differences in rise and fall time between the signal levels on the trio of wires. With reference also to FIG. 8, the first timing charts 900 illustrate the signaling states of the trio of signal wires 310a, 310b and 310c (A, B, and C) before and after a transition and second timing charts 920 illustrate the outputs of the differential receivers 802a, 802b and 802c, which provides difference signals 810 representative of the differences between signal wires 310a, 310b and 310c. In many instances, a set of differential receivers 802a, 802b and 802c may be configured to capture transitions by comparing different combinations for two signal wires 310a, 310b and 310c. In one example, these differential receivers 802a, 802b and 802c may be configured to produce outputs by determining the difference (e.g. by subtraction) of their respective input voltages.

In each of the examples shown in the timing charts 900 and 920, the initial symbol (−z) 516 (see FIG. 8) transitions to a different symbol. As shown in the timing charts 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing charts 922, 932, 938 for the differential receiver outputs.

In a first example corresponding to the timing charts 902, 922, a transition occurs from symbol (−z) 516 to symbol (−x) 512 (see FIG. 8) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from −2 difference 926 to a +1 difference 928.

In a second example corresponding to the timing charts 904, 932, a transition occurs from symbol (−z) 516 to symbol (+z) 506 in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing charts 906, 938, a transition occurs from symbol (−z) 516 to symbol (+x) 502 in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

Figure 10:
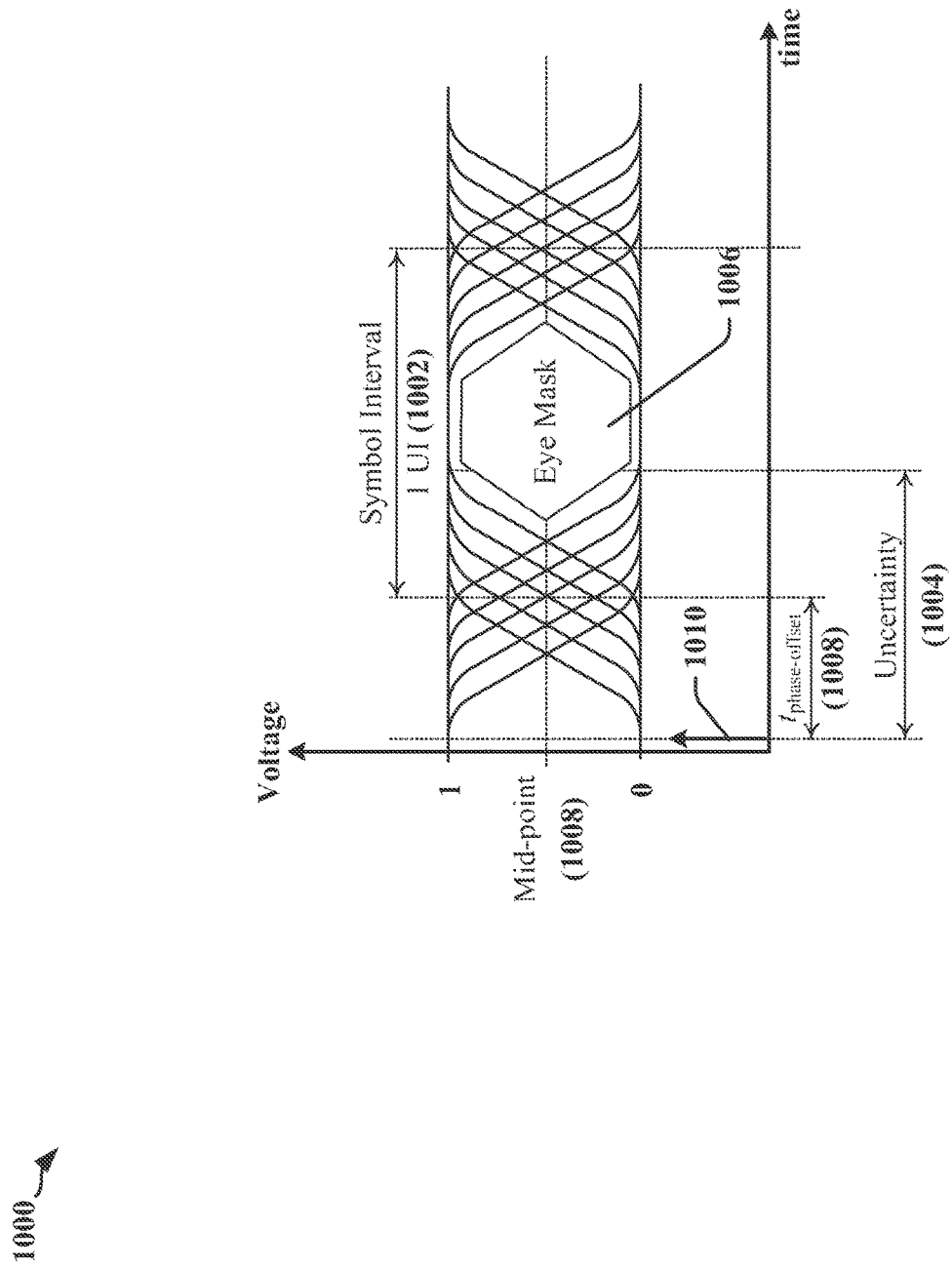
FIG. 10 illustrates transition regions and eye regions in an eye-pattern.

FIG. 10 illustrates an eye pattern 1000 generated as an overlay of multiple symbol intervals, including a single symbol interval 1002. A signal transition region 1004 represents a time period of uncertainty at the boundary between two symbols where variable signal rise times prevent reliable decoding. State information may be determined reliably in a region defined by an eye mask 1006 within an "eye opening" that represents the time period in which the symbol is stable and can be reliably received and decoded. The eye mask 1006 masks off a region in which zero crossings do not occur, and the eye mask is used by the decoder to prevent multiple clocking due to the effect of subsequent zero crossings at the symbol interval boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where an eye pattern 1000 can be utilized as a basis for judging the ability to reliably recover data based on the eye opening of the eye pattern 1000.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A–B, B–C, and C–A outputs of differential receivers 802a, 802b and 802c of FIG. 6).

Figure 11:
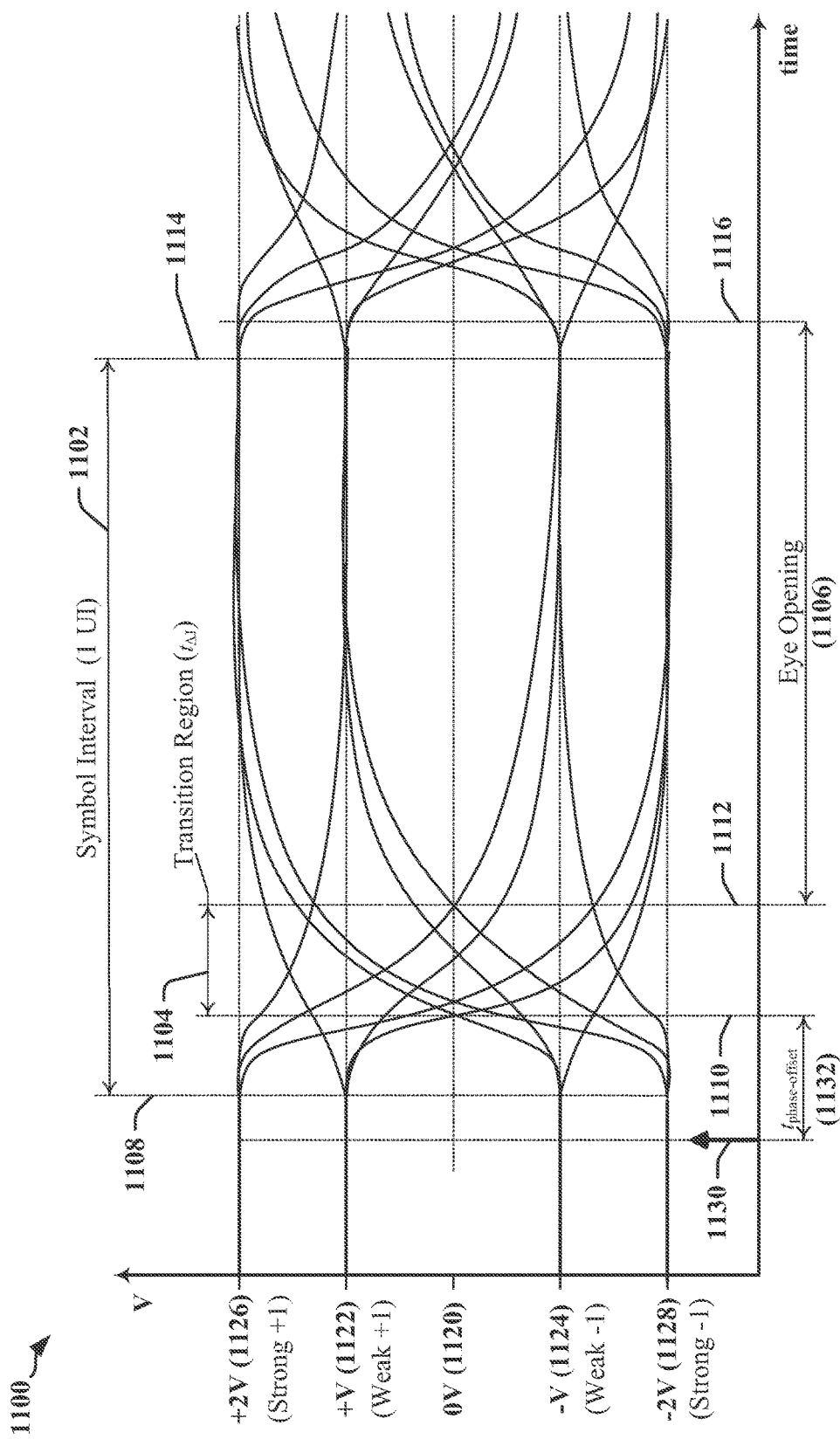
FIG. 11 illustrates an example of an eye-pattern generated for a C-PHY 3-Phase interface.

FIG. 11 illustrates an example of an eye-pattern 1100 generated for a C-PHY 3-phase signal. The eye-pattern 1100 may be generated from an overlay of multiple symbol intervals 1102. The eye-pattern 1100 may be produced using a fixed and/or symbol-independent trigger 1130. The eye-pattern 1100 includes an increased number of voltage levels 1120, 1122, 1124, 1126, 1128 that may be attributed to the multiple voltage levels measured by the differential receivers 802a, 802b, 802c an N-phase receiver circuit (see FIG. 8). In the example, the eye-pattern 1100 may correspond to possible transitions in 3-wire, 3-phase encoded signals provided to the differential receivers 802a, 802b, and 802c. The three voltage levels may cause the differential receivers 802a, 802b, and 802c to generate strong voltage levels 1126, 1128 and weak voltage levels 1122, 1124 for both positive and negative polarities. Typically, only one signal wire 310a, 310b and 310c is undriven in any symbol and the differential receivers 802a, 802b, and 802c do not produce a 0 state (here, 0 Volts) output. The voltages associated with strong and weak levels need not be evenly spaced with respect to a 0 Volts level. For example, the weak voltage levels 1122, 1124 represent a comparison of voltages that may include the voltage level reached by an undriven signal wire 310a, 310b and 310c. The eye-pattern 1100 may overlap the waveforms produced by the differential receivers 802a, 802b, and 802c because all three pairs of signals are considered simultaneously when data is captured at the receiving device. The waveforms produced by the differential receivers 802a, 802b, and 802c are representative of difference signals 810 representing comparisons of three pairs of signals (A–B, B–C, and C–A).

Drivers, receivers and other devices used in a C-PHY 3-Phase decoder may exhibit different switching characteristics that can introduce relative delays between signals received from the three wires. Multiple receiver output transitions may be observed at each symbol interval boundary 1108 and/or 1114 due to slight differences in the rise and fall time between the three signals of the trio of signal wires 310a, 310b, 310c and due to slight differences in signal propagation times between the combinations of pairs of signals received from the signal wires 310a, 310b, 310c. The eye-pattern 1100 may capture variances in rise and fall times as a relative delay in transitions near each symbol interval boundary 1108 and 1114. The variances in rise and fall times may be due to the different characteristics of the 3-Phase drivers. Differences in rise and fall times may also result in an effective shortening or lengthening of the duration of the symbol interval 1102 for any given symbol.

A signal transition region 1104 represents a time, or period of uncertainty, where variable signal rise times prevent reliable decoding. State information may be reliably determined in an "eye opening" 1106 representing the time period in which the symbol is stable and can be reliably received and decoded. In one example, the eye opening 1106 may be determined to begin at the end 1112 of the signal transition region 1104, and end at the symbol interval boundary 1114 of the symbol interval 1102. In the example depicted in FIG. 11, the eye opening 1106 may be determined to begin at the end 1112 of the signal transition region 1104, and end at a time 1116 when the signaling state of the signal wires 310a, 310b, 310c and/or the outputs of the three differential receivers 802a, 802b and 802c have begun to change to reflect the next symbol.

The maximum speed of a communication link 220 configured for N-Phase encoding may be limited by the duration of the signal transition region 1104 compared to the eye opening 1106 corresponding to the received signal. The minimum period for the symbol interval 1102 may be constrained by tightened design margins associated with the CDR circuit 624 in the decoder 600 illustrated in FIG. 6, for example. Different signaling state transitions may be associated with different variations in signal transition times corresponding to two or more signal wires 310a, 310b and/or 310c, thereby causing the outputs of the differential receivers 802a, 802b and 802c in the receiving device to change at different times and/or rates with respect to the symbol interval boundary 1108, where the inputs of the differential receivers 802a, 802b and 802c begin to change. The differences between signal transition times may result in timing skews between signaling transitions in two or more difference signals 810. CDR circuits may include delay elements and other circuits to accommodate timing skews between the difference signals 810.

CDR Implementation

Figure 13:
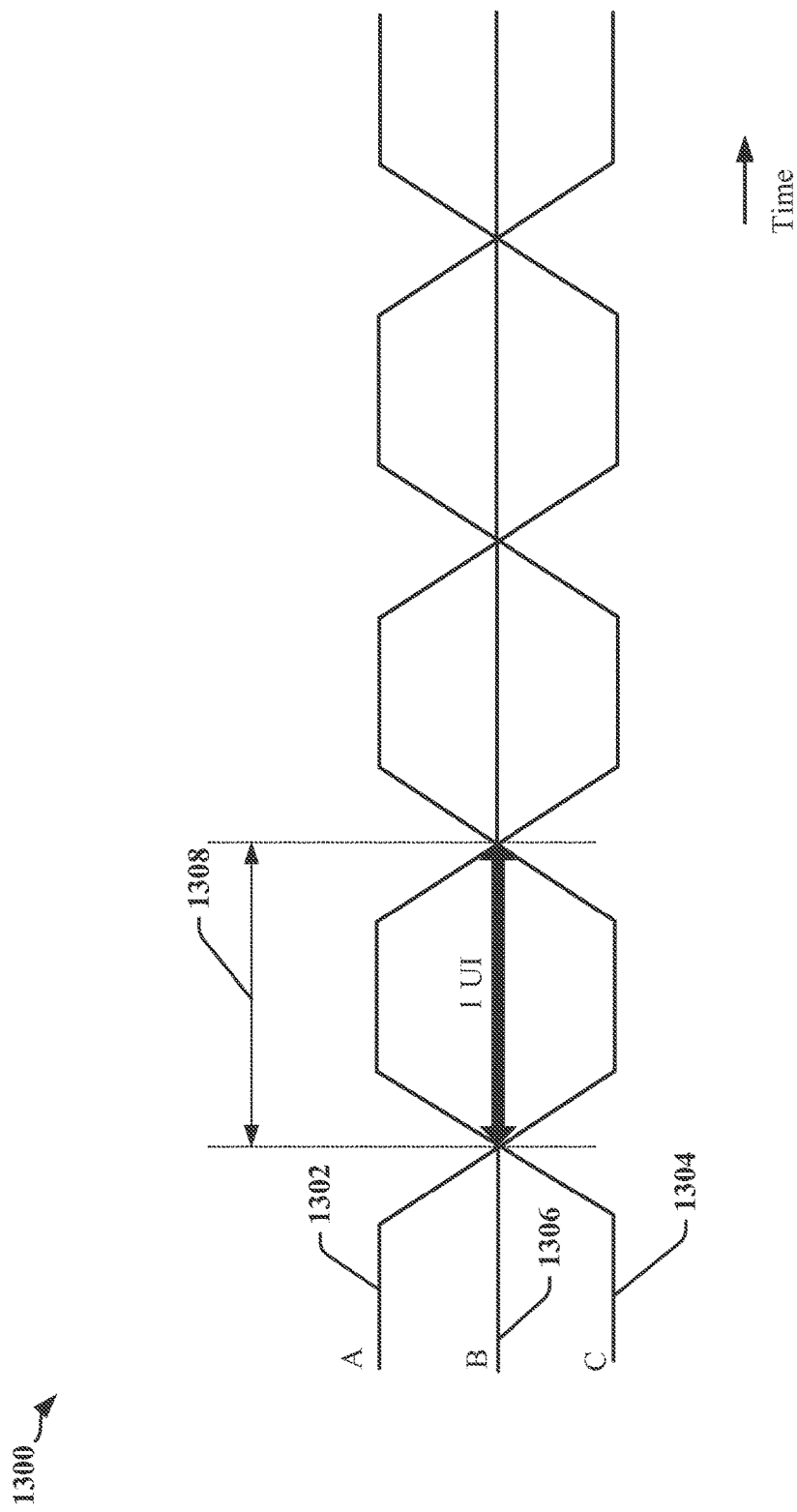
FIG. 13 illustrates an exemplary calibration pattern according to certain aspects disclosed herein.

FIG. 13 illustrates an exemplary CDR design 1300 that separates half-rate clock generation from the C-PHY input-delta pulse generation. As illustrated, the C-PHY input delta includes the AB, BC, and CA difference signals 1302, 1304, 1306, which are input to a network of logic gates 1308a, 1308b, and 1308c (XOR gates in this example), logic gates 1310a, 1310b, and 1310c, and OR gate 1312 in order to generate a first clock signal or pulses 1314 based on the transitions in the difference signals 1302, 1304, 1306.

The signal or pulses 1314 are input to a flip-flop logic 1316, such as a D flip flop, where the flip flop logic 1316 is clocked by the signal or pulses 1314 where an input value (data or D) is held on an output (Q) until a pulse or asserted value is input at a clock input (CLK). The flip flop logic 1316 is, in turn, coupled in a delay loop comprised of a programmable generator 1318 coupled to the output Q of the flip flop logic 1316. Generator 1318 may be a half-UI generator that is configured to generate a half UI based recovered clock (i.e., a clock having a cycle equal to two UI's or half the rate of the clock rate of the incoming first clock signal or pulses). The generated half rate or delayed RCLK clock 1320 engendered by generator 1318 is fed back to the data input of the flip-flop logic as part of delay loop, which includes an inverter 1319, which inverts the signal output by the generator 1318. Since the flip-flop logic 1316 is clocked by the signal or pulses 1314, with a D flip-flop in an aspect, resampling by the flip-flop logic 1316 will occur with each pulse rising edge. It is noted that the half-UI generator may be preconfigured or be configured according to predetermined algorithm/metric. Also, the generator 1318 may be pre-calibrated before high-speed data bursts are received in the receiver. The output Q of flip-flop logic 1316 is then also used to derive the recovered clock signal (RCLK) 1322 to be used in the decoder of the receiver (e.g., decoder 600 as shown in FIG. 6) after being passed through inverters 1324 and 1326.

In other aspects, an automatic half UI tracking pulse will be created as soon the first data transition is received at the CDR 1300, regardless of the other possible transitions that may occur in input data within one UI. The first transition works as a start indicator for half-UI generator to produce a pulse for the logic 1318 to pull down the voltage to generate a half-UI based recovered clock. The Q output of the flip-flop logic 1318 also constitutes the recovered clock signal RCLK 1322, which will be a half UI or half rate clock. An advantage of the exemplary circuit structure illustrated in FIG. 13 is that the circuitry is not subject to PVT or mismatch between lanes since the circuitry only considers an absolute UI timing relationship.

To support a higher data rate of three-level signaling system, the calibration/training for clock and data recovery (CDR) becomes significantly crucial, esp. in the situation where the channel condition gets worse as the length is extended to support multiple applications. Furthermore, it is difficult to control the delay between each wire over the same chip causing the issue to have timing close for CDR. As proposed calibration package, the sequence is aimed to provide the calibration for three receivers at one time without the need for an extra pattern since the comparators will output the difference between wire1, wire2 and wire3 at equal values. Moreover, the proposed calibration sequence offers the system the information of half UI through a combination of detector and generator.

Calibration Pattern

In order to support a higher data rate in a three-level signaling system, as discussed before, the calibration or training for the CDR becomes important, especially in situations where the channel condition gets worse as the length of the physical channel (i.e., wires A, B, C) is extended to support multiple applications. The delay that occurs between signaling in each wire can be attempted to be controlled over the same chip resulting in close timing for CDR, which increases the importance of proper calibration of the CDR, as well as ensuring that distortion of the duty cycle of the receiver clock (e.g., SCLK) is corrected.

Typical C-PHY calibration patterns typically have a high to low voltage pattern, or alternatively a low to high pattern. In contrast, the present disclosure features an improved calibration pattern that provides accurate calibration data concerning the UI length/duration, as well as being able to provide accurate information for correcting clock duty cycle distortion. As will be discussed in more detail below, the present disclosure provides, in particular, a calibration pattern generated by toggling any two of the wires (e.g., A and B) and keeping the third wire (e.g., C) remaining at a common mode to produce only one transition per predetermined time period or UI. The single transition provides absolute UI length/duration information that can be used in a receiver CDR for both timing calibration and duty-cycle correction.

FIG. 13 illustrates an exemplary calibration pattern 1300 according to certain aspects of the present disclosure. Pattern 1300 is a calibration pattern generated by toggling two wires (e.g., 1302, 1304) every predetermined time period 1308, while a third remaining wire 1306 is kept a constant level, such as an approximate 200 mV common constant voltage as specified by the MIPI C-PHY specifications as one example although not limited to such. While wires A and C 1302, 1304 are shown being toggled in the illustrated example and wire B 1306 being constant, the calibration pattern is not limited to such specific wires as any two of wires A, B, or C could be toggled. This calibration pattern produces only a single transition at a time and experiences negligible jitter effects on the accuracy of the predetermined time interval 1308 or UI, thus yielding a UI measurement with negligible variation. Accordingly, the calibration pattern 1300 provides an accurate UI period to a receiver or calibration generator. Of further note, calibration pattern 1300 may also serve to function as a clock pattern in the disclosed differential signaling system. Moreover, it is noted that calibration pattern 1300 could be used to provide a clock pattern too any differential signaling system, and thus a calibration generator generating such pattern could be utilized across different differential signaling systems.

In an aspect, calibration pattern 1300 may be generated at a transmitter side, such as transmitter or master side, such as 202 in FIG. 2 or 300 in FIG. 3, but is not limited to such. Also, the pattern 1300 may be generated and transmitted for each low power mode as specified in the MIPI C-PHY specification prior to switching to a high speed data transmission mode.

Figure 14:
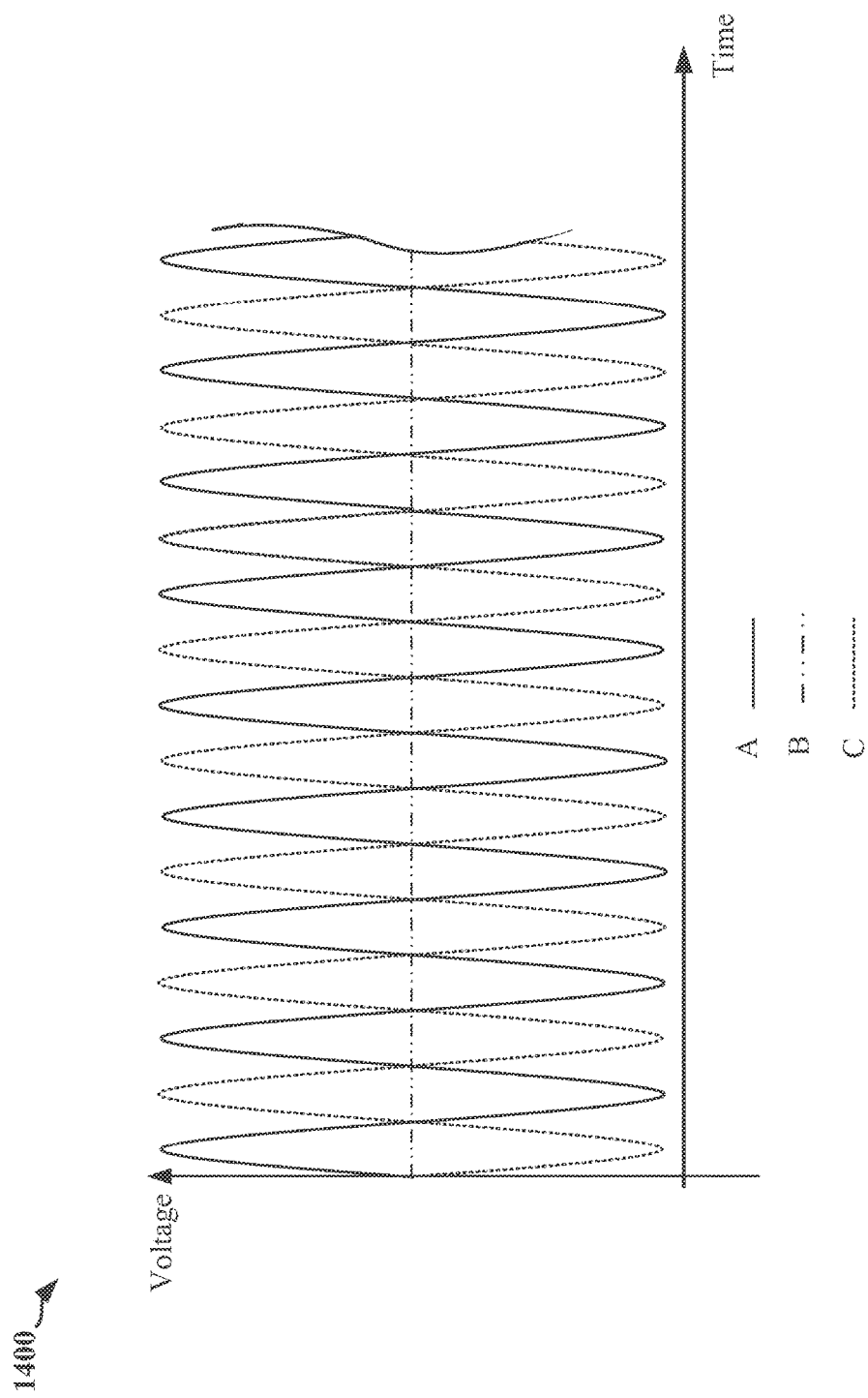
FIG. 14 illustrates a diagram of the single ended signals of the 3 lines at a C-PHY receiver interface resultant from the calibration pattern.

FIG. 14 illustrates an exemplary diagram 1400 of the single ended signals of the 3 lines at a C-PHY receiver interface (e.g., receiver 600 in FIG. 6) resultant from application of a calibration pattern on the 3-wire interface that is similar to the pattern 1300 in FIG. 13. As may be seen in this example, the A and C line voltages are toggled between maximum and minimum voltages at 180 degrees out of phase from one another, while the voltage of line B is kept or maintained at a constant voltage.

Figure 15:
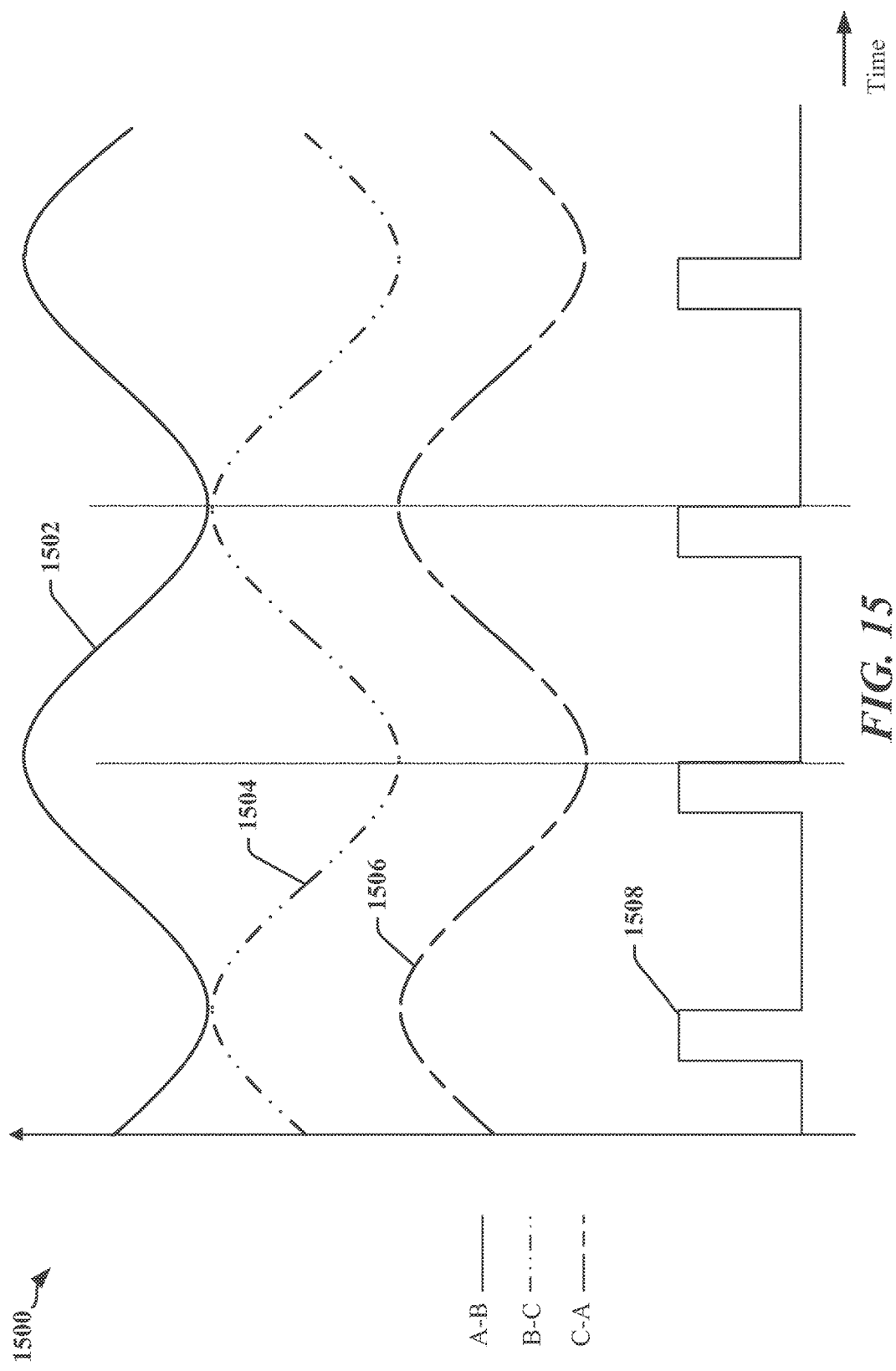
FIG. 15 illustrates a diagram of the differential signals of the 3 lines at a C-PHY receiver interface resultant from the calibration pattern.

FIG. 15 illustrates a diagram 1500 of the differential signals of the 3 lines at a C-PHY receiver interface resultant from the calibration pattern. The difference signals may be derived with differential receivers such as 802 shown in FIG. 8. Thus, signal 1502 is the difference between the A and B lines, signal 1504 is the difference between the B and C lines, and signal 1506 is the difference between the C and A lines. Signal 1508 is a signal transition triggered clock signal, wherein signal 1508 is the recovered clock that can be used for sampling data for serial to parallel conversion.

Examples of Processing Circuits and Methods

Figure 16:
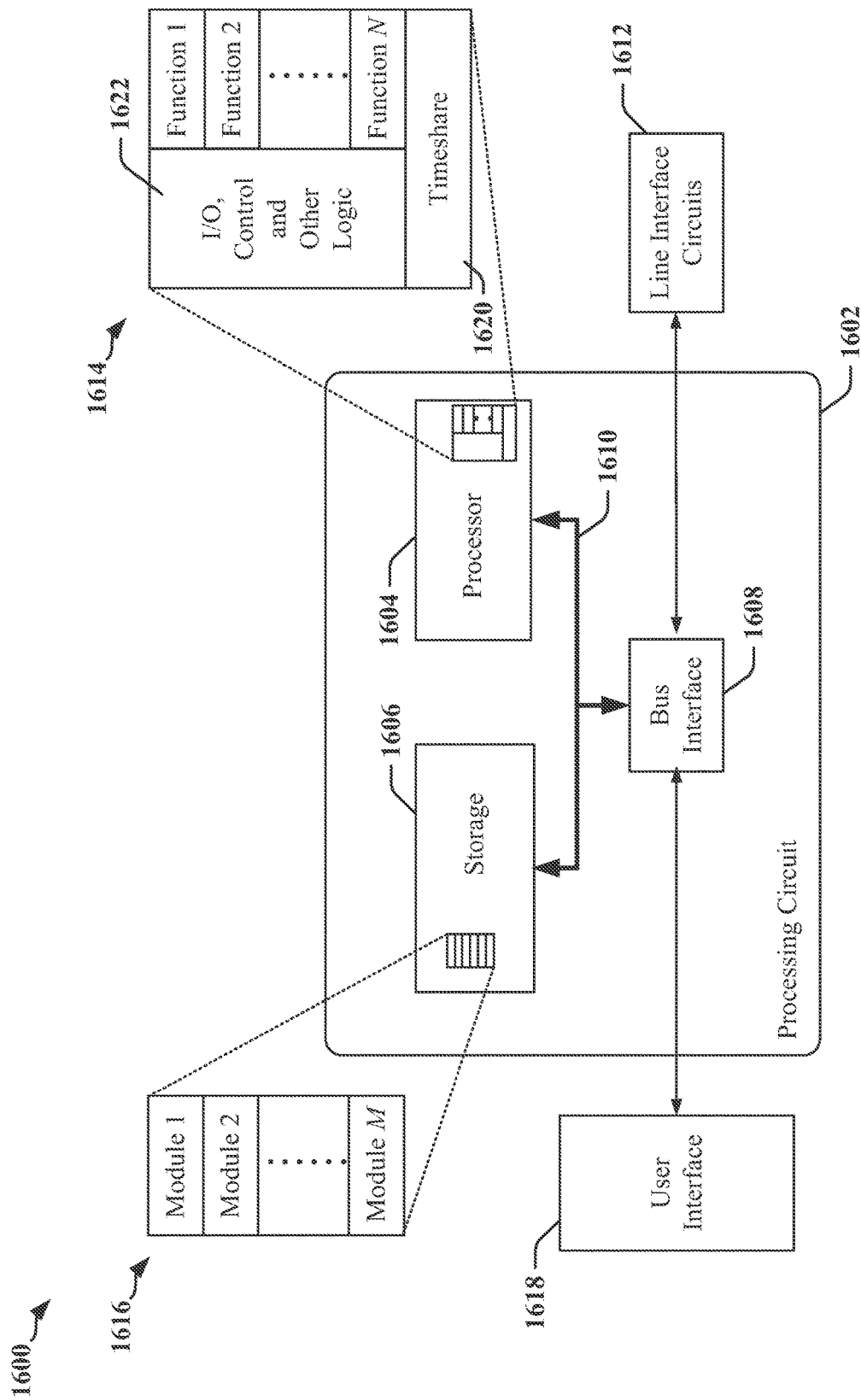
FIG. 16 is a block diagram illustrating an example of an apparatus employing a processing circuit that may be adapted according to certain aspects disclosed herein.

FIG. 16 is a conceptual diagram 1600 illustrating an example of a hardware implementation for an apparatus employing a processing circuit 1602 that may be configured to perform one or more functions disclosed herein. In accordance with various aspects of the disclosure, an element, or any portion of an element, or any combination of elements as disclosed herein may be implemented using the processing circuit 1602. The processing circuit 1602 may include one or more processors 1604 that are controlled by some combination of hardware and software modules. Examples of processors 1604 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The bus 1610 may also link various other circuits such as timing sources, timers, peripherals, voltage regulators, and power management circuits. A bus interface 1608 may provide an interface between the bus 1610 and one or more transceivers 1612. A transceiver 1612 may be provided for each networking technology supported by the processing circuit. In some instances, multiple networking technologies may share some or all of the circuitry or processing modules found in a transceiver 1612. Each transceiver 1612 provides a means for communicating with various other apparatus over a transmission medium. Depending upon the nature of the apparatus, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain software maintained and/or organized in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as the transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to the transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

Figure 17:
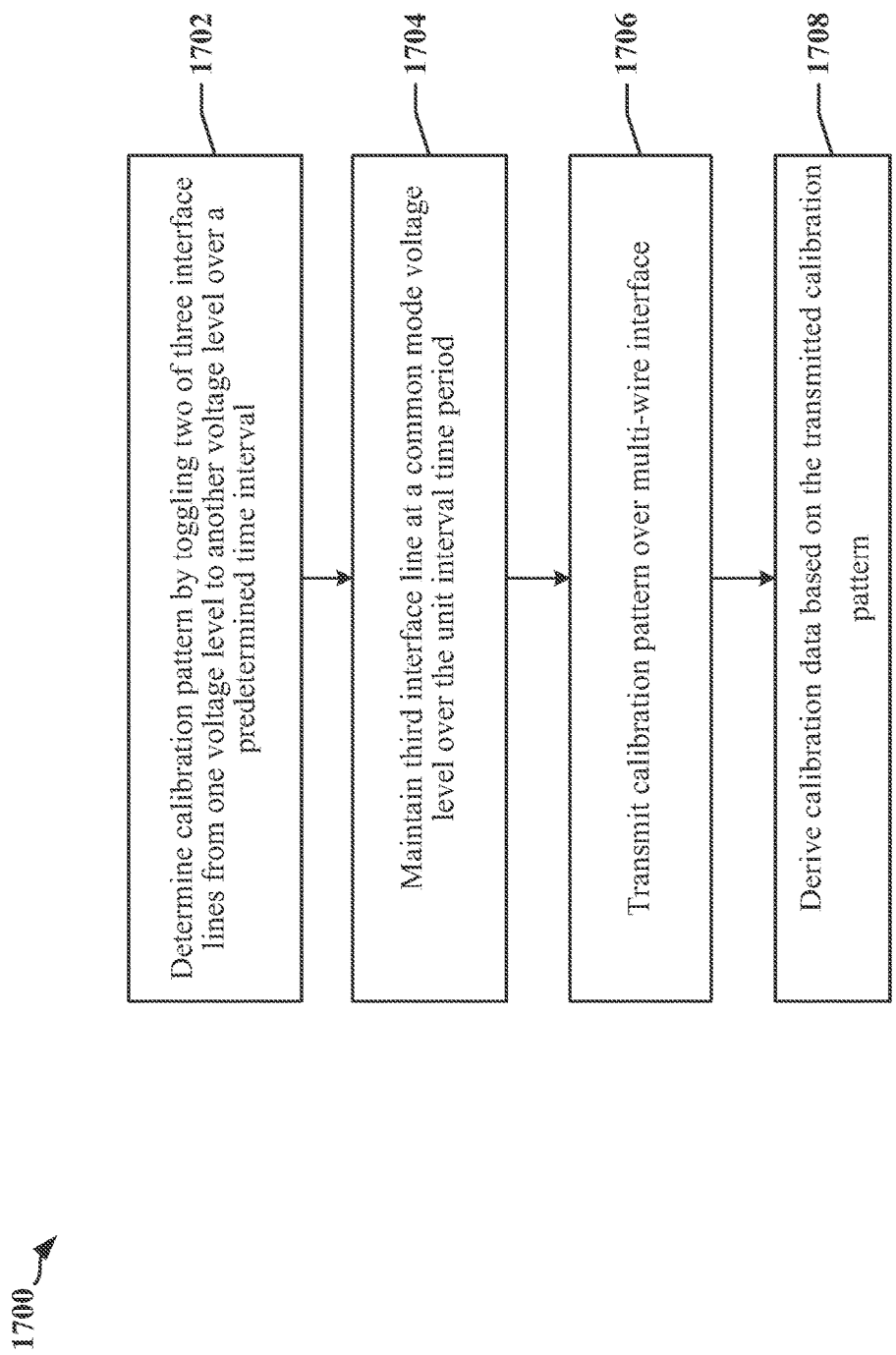
FIG. 17 is a flow chart of a method of clock generation according to certain aspects disclosed herein.

FIG. 17 is a flow chart of a method 1700 for providing calibration data in a 3-wire, multi-phase communication bus or interface that may be performed by transmitter and receiver circuits coupled to the 3-wire, multi-phase communication bus or interface, which may be configured as a MIPI C-PHY interface. Method 1700 includes generating and transmitting a calibration pattern on the 3-line interface, where the generation of the pattern includes toggling two of three interface lines from one voltage level to another voltage level over a predetermined time interval as shown in block 1702. Furthermore, generation of the calibration pattern includes maintaining the remaining third interface line at a common mode voltage level over the unit interval time period as shown in block 1704. With the toggling of just two lines while maintaining the third line at the common mode voltage level, only a single transition occurs for the predetermined time interval. For a MIPI C-PHY system, the common mode voltage level may be set at approximately 200 millivolts, which is based on the MIPI C-PHY standards.

As shown in block 1706, the determined calibration pattern is transmitted over the 3-wire interface. It is noted that, in an aspect, the processes of transmitting and generating the calibration pattern may be implemented concurrently where a transmitting device is configured to toggle two lines and maintain the third line at a constant voltage, where the process of providing such voltages on the 3 lines inherently achieves transmission of the calibration pattern by modulating the line voltages of the 3-line interface.

Method 1700 further includes then deriving calibration data based on the transmitted calibration pattern as shown at block 1708. This process in block 1708 of deriving calibration data may further include receiving the calibration pattern at a differential receiver and determining an eye pattern or diagram to measure the predetermined time interval, which may be a single unit interval (UI). As discussed before, the calibration data is used to provide an accurate timing of the UI, as the jitter is negligible with the present calibration pattern. Furthermore, the calibration pattern may be utilized to determine a clock pattern or duty cycle for a clock based on the timing of the calibration pattern signals. In some aspects, the derived clock pattern will have a cycle of one unit internal (UI), where the clock pattern is utilized to correct a duty cycle of a receiver clock within a receiver device coupled to the 3-line interface.

Figure 12:
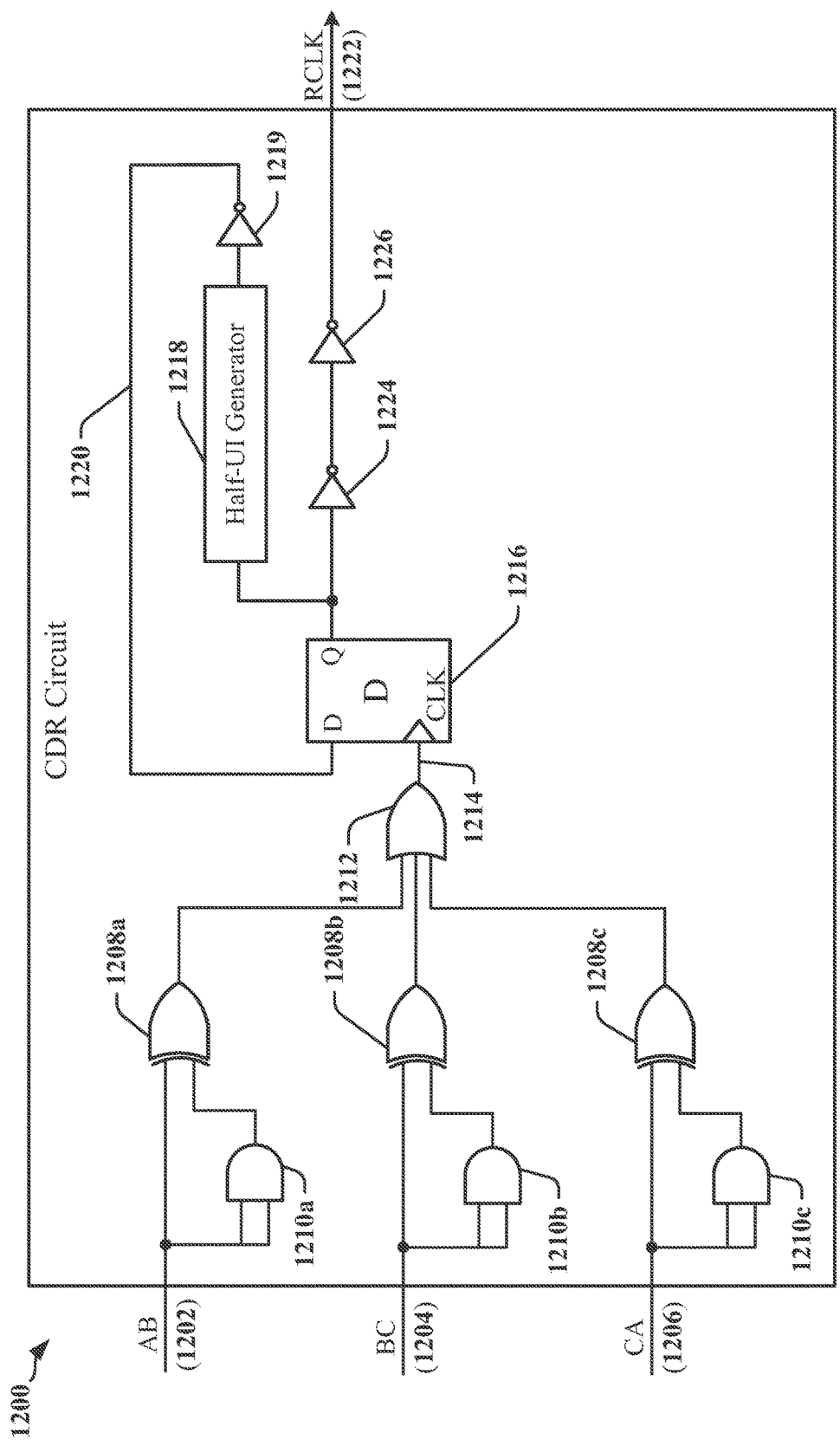
FIG. 12 illustrates an example of a CDR circuit for a C-PHY 3-Phase interface.

In further aspects, method 1700 may include setting a delay generator in a clock and data recovery (CDR) circuitry capturing symbols from the 3-wire, 3-phase interface using the derived calibration data. In one example, the delay generator is a half-UI generator such a generator 1218 in FIG. 12. Since the predetermined time period may be a single UI in some aspects, the half UI interval is easily and accurately determined based on the derived calibration data. Method 1700 may also be configured such that the calibration pattern is generated and transmitted on the 3-line interface for every low power mode on the 3-line interface prior to transition to a high speed data transmission mode on the C-PHY interface.

Figure 18:
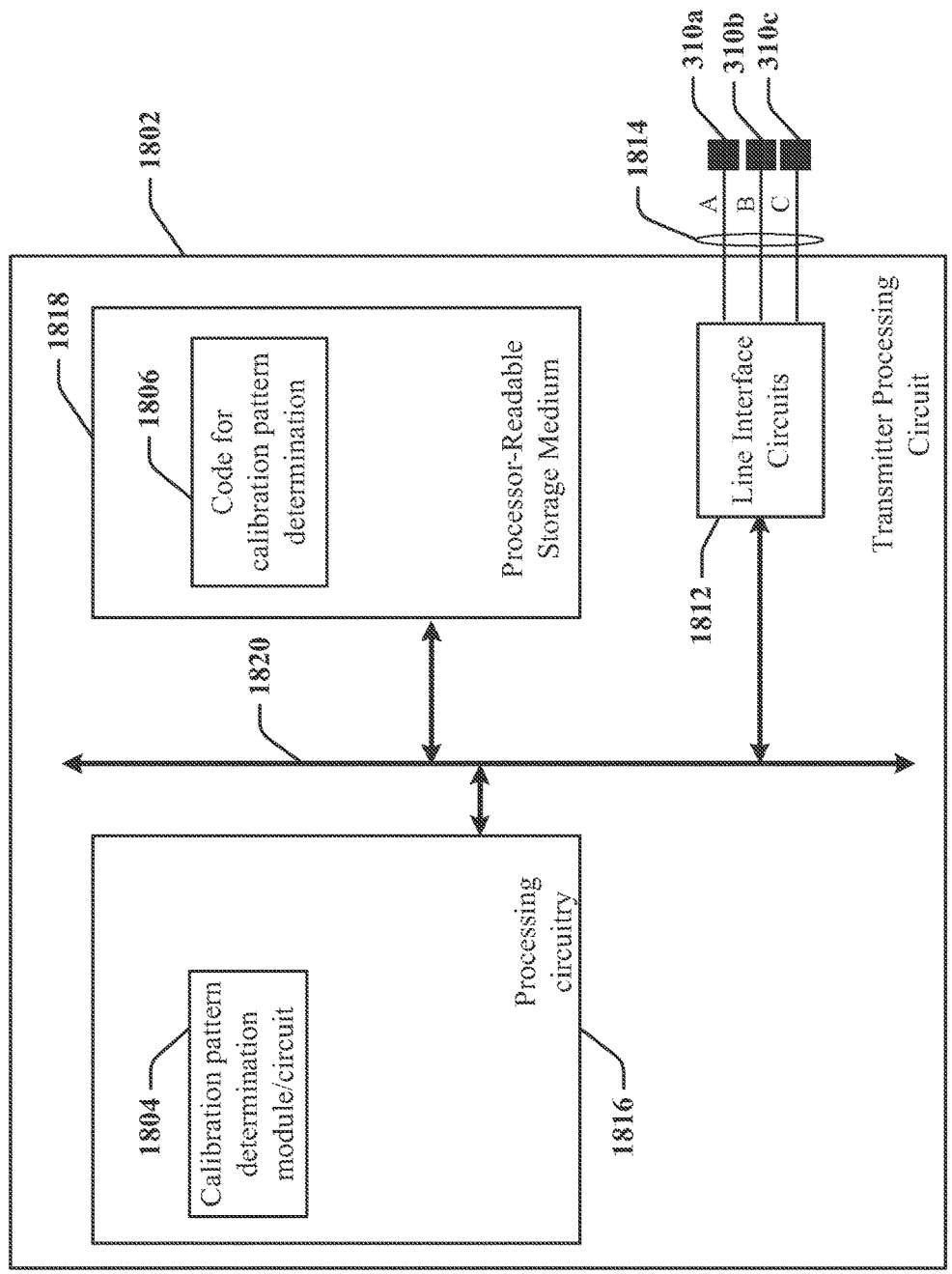
FIG. 18 is a diagram illustrating an example of a hardware implementation for an apparatus employing a processing employing a processing circuit adapted according to certain aspects disclosed herein.

FIG. 18 is a diagram illustrating an example of a hardware implementation for an apparatus 1800 employing a processing circuit 1802. In the illustrated example, processing circuit 1802 may be implemented within a transmitter for a 3-line, multi-phase interface, such as a C-PHY interface. In further aspects, the apparatus 1800 may be implemented as part of a transmitter in a master device, but could also be implemented in a transmitter within a slave device as well.

The processing circuit 1802 typically contains a processor or processing circuitry 1816 that may include one or more of a microprocessor, microcontroller, digital signal processor, a sequencer and a state machine. The processing circuit 1802 may be implemented with a bus architecture, represented generally by the bus 1820. The bus 1820 may include any number of interconnecting buses and bridges depending on the specific application of the processing circuit 1802 and the overall design constraints. The bus 1820 links together various circuits including one or more processors and/or hardware modules, represented by the processor 1816, specific modules or circuits such as calibration pattern determination module 1804, transmitter/line interface circuits 1812 that send signaling over the various lines, connectors, or wires 1814, and computer-readable storage medium 1818. The bus 1820 may also link various other circuits such as timing sources, peripherals, voltage regulators, and power management circuits, which are well known in the art, and therefore, will not be described any further.

The processor 1816 is responsible for general processing, including the execution of software stored on the computer-readable storage medium 1818. The software, when executed by the processor 1816, causes the processing circuit 1802 to perform the various functions described before for any particular apparatus. The computer-readable storage medium 1818 may also be used for storing data that is manipulated by the processor 1816 when executing software, including data encoding for symbols transmitted over the connectors or wires 1814, which may be configured as data lanes. The processing circuit 1802 further includes at least module 1804, discussed above. The modules including module 1804 may be software modules running in the processor 1816, resident/stored in the computer-readable storage medium 1818, one or more hardware modules coupled to the processor 1816, or some combination thereof. The modules including module 1804 may include microcontroller instructions, state machine configuration parameters, or some combination thereof.

In one configuration, the apparatus 1800 may be configured for data communication over a C-PHY 3-phase interface. The apparatus 1800 may include module and/or circuit 1804 that is configured to generate and cause transmission of the calibration pattern discussed above in connection with FIG. 13. Additionally, processor-readable storage medium 1818 may include code 1806 that is configured for causing the processing circuitry 1816 to generate the disclosed calibration pattern.

The apparatus 1800 may be configured for various modes of operation. In one example, the apparatus.

Figure 19:
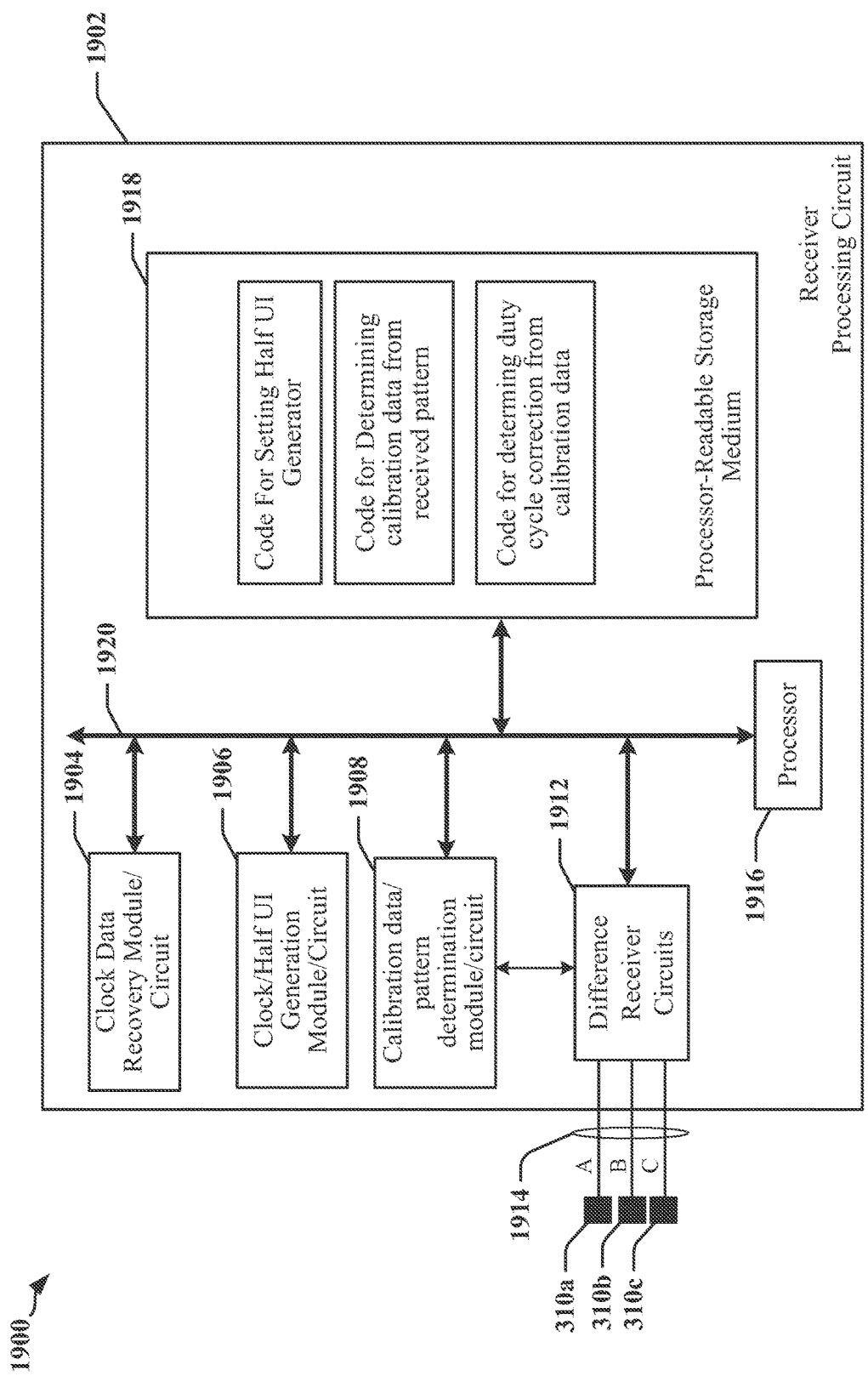
FIG. 19 is a diagram illustrating an example of another hardware implementation for an apparatus employing a processing employing a processing circuit adapted according to certain aspects disclosed herein.

FIG. 19 is a diagram illustrating an example of a hardware implementation for an apparatus 1800 employing a processing circuit 1902. In the illustrated example, processing circuit 1802 may be implemented within a receiver for a 3-line, multi-phase interface, such as a C-PHY interface. In a further example, the apparatus 1900 may be implemented as part of a receiver in slave device, but could also be implemented in a receiver within a master device as well according to certain examples.

The processing circuit 1902 typically contains a processor 1916 that may include one or more of a microprocessor, microcontroller, digital signal processor, a sequencer and a state machine. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the processor 1916, the modules or circuits 1904, 1906, and 1908, difference receiver circuits 1912 that determine difference signaling state between different pairs of the connectors or wires 1914 and a computer-readable storage medium 1918. The bus 1920 may also link various other circuits such as timing sources, peripherals, voltage regulators, and power management circuits, which are well known in the art, and therefore, will not be described any further.

The processor 1916 is responsible for general processing, including the execution of software or code stored on the computer-readable storage medium 1918. The software or code, when executed by the processor 1916, causes the processing circuit 1902 to perform the various functions described before for any particular apparatus. The computer-readable storage medium 1918 may also be used for storing data that is manipulated by the processor 1916 when executing software, including data decoded from symbols transmitted over the connectors or wires 1914, which may be configured as data lanes and clock lanes. The processing circuit 1902 further includes at least one of the modules 1904, 1906, and 1908. The modules 1904, 1906, and 1908 may be software modules running in the processor 1916, resident/stored in the computer-readable storage medium 1918, one or more hardware modules coupled to the processor 1916, or some combination thereof. The modules 1904, 1906, and/or 1908 may include microcontroller instructions, state machine configuration parameters, or some combination thereof.

In one configuration, the apparatus 1900 may be configured for data communication over a C-PHY 3-phase interface. The apparatus 1900 may include a module and/or circuit 1904 that is configured to recover a first clock signal from timing information embedded in sequences of symbols transmitted on the connectors or wires 1914, a module and/or circuit 1906 for recovered clock generation including half UI generation, and a module and/or circuit 1908 for determining calibration data from the calibration sequence or pattern received from a transmitter, such as that shown in FIG. 18. It is noted that the calibration data generated in module 1908 may include UI measurement based on the received calibration pattern in accordance with the pattern disclosed herein, as well as data related to a duty cycle that may be utilized to correct clock duty cycle distortion. Module 1906 may utilize the UI measurement or determination to determine a half UI time period for programming half UI generation in delay circuitry within the receiver. The duty cycle distortion correction may be effected in module 1904 or in a separate module/circuit for duty cycle correction (not shown).

In other examples, the processor-readable storage medium 1918 may include various code or instructions including code for causing the processor 1916 to determine the calibration data from the received calibration pattern, to set the half UI generator (which may be based on the calibration data determined from the received calibration pattern), and to determine duty cycle correction from the received calibration pattern. The apparatus 1900 may be configured for various modes of operation, such as MIPI C-PHY low power mode and high speed data mode.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for providing calibration in data communication devices coupled to a 3-line interface, comprising:
   generating and transmitting a calibration pattern on the 3-line interface, the generation of the pattern comprising:
      toggling two of three interface lines from one voltage level to another voltage level over a predetermined time interval; and
      maintaining a remaining third interface line at a common mode voltage level over the predetermined time interval, wherein only a single transition occurs for the predetermined time interval; and
   deriving calibration data based on the transmitted calibration pattern.

2. The method of claim 1, further comprising:
   wherein the predetermined time interval is a single unit interval (UI) and the calibration data is used to provide an accurate timing of the UI.

3. The method of claim 1, further comprising:
   setting a delay generator in a clock and data recovery (CDR) circuitry capturing symbols from the 3-line interface using the derived calibration data.

4. The method of claim 3, wherein the delay generator includes a half unit interval (UI) generator and the predetermined time period is a single UI, wherein the half UI is determined based on the derived calibration data.

5. The method of claim 1, wherein the calibration data is utilized to derive a clock pattern having a cycle of one unit internal (UI), wherein the clock pattern is utilized to correct a duty cycle of a receiver clock within a receiver device coupled to the 3-line interface.

6. The method of claim 1, wherein the 3-line interface is a Mobile Industry Processor Interface (MIPI) C-PHY interface.

7. The method of claim 6, wherein the calibration pattern is generated and transmitted on the 3-line interface for every low power mode on the 3-line interface prior to transitions to high speed data transmission modes on the MIPI C-PHY interface.

8. The method of claim 1, wherein the common mode voltage level is set at approximately 200 millivolts.

9. An apparatus for providing calibration on a 3-wire, 3-phase interface, comprising:
   means for generating and transmitting a calibration pattern on the 3-wire interface, the means for generation the pattern comprising:
      means for toggling two of three interface wires from one voltage level to another voltage level over a predetermined time interval; and
      means for maintaining a remaining third interface line at a common mode voltage level over the unit interval time period, wherein only a single transition occurs for the predetermined time interval.

10. The apparatus of claim 9, further comprising:
    means for deriving calibration data based on the transmitted calibration pattern within a receiver device coupled to the 3-line interface.

11. The apparatus of claim 9, wherein the predetermined time interval is a single unit interval (UI) and the calibration data is used to provide an accurate timing of the UI.

12. The apparatus of claim 10, further comprising:
    means for setting a delay generator in a clock and data recovery (CDR) circuitry to capture symbols from the 3-line interface using the derived calibration data.

13. The apparatus of claim 12, wherein the delay generator includes a half unit interval (UI) generator and the predetermined time period is a single UI, wherein the half UI is determined based on the derived calibration data.

14. The apparatus of claim 9, wherein the calibration data is utilized to derive a clock pattern having a cycle of one unit internal (UI), wherein the clock pattern is utilized to correct a duty cycle of a receiver clock within a receiver device coupled to the 3-line interface.

15. The apparatus of claim 9, wherein the 3-line interface is a MIPI C-PHY interface.

16. The apparatus of claim 15, wherein the calibration pattern is generated and transmitted on the 3-line interface for every low power mode on the 3-line interface prior to transitions to high speed data transmission modes on the MIPI C-PHY interface.

17. A processor readable, non-transitory storage medium, comprising code for:
    generating and transmitting a calibration pattern on a 3-wire, 3-phase interface, the generation of the pattern comprising:
       toggling two of three interface lines from one voltage level to another voltage level over a predetermined time interval; and
       maintaining a remaining third interface line at a common mode voltage level over the unit interval time period, wherein only a single transition occurs for the predetermined time interval.

18. The medium of claim 17, further comprising code for deriving calibration data based on the transmitted calibration pattern.

19. The medium of claim 17, wherein the predetermined time interval is a single unit interval (UI) and the calibration data is used to provide an accurate timing of the UI.

20. The medium of claim 18, further comprising code for:
    setting a delay generator in a clock and data recovery (CDR) circuitry capturing symbols from the 3-line interface using the derived calibration data.

21. The medium of claim 20, wherein the delay generator includes a half unit interval (UI) generator and the predetermined time period is a single UI, wherein the half UI is determined based on the derived calibration data.

22. The medium of claim 17, wherein the calibration data is configured to be utilized to derive a clock pattern having a cycle of one unit internal (UI), wherein the clock pattern is utilized to correct a duty cycle of a receiver clock within a receiver device coupled to the 3-line interface.

23. The medium of claim 17, wherein the 3-line interface is a MIPI C-PHY interface.

24. The medium of claim 23, wherein the calibration pattern is generated and transmitted on the 3-line interface for every low power mode on the 3-line interface prior to transitions to high speed data transmission modes on the MIPI C-PHY interface.

25. A system for data communication, comprising:
    calibration data determination circuitry in a receiver, the calibration data determination circuitry configured to:
        receive a calibration pattern on a 3-line interface from a transmitter, wherein the pattern is generated by toggling two of three interface lines from one voltage level to another voltage level over a predetermined time interval, and maintaining a remaining third interface line at a common mode voltage level over the predetermined time interval, wherein only a single transition occurs for the predetermined time interval; and
        derive calibration data based on the received calibration pattern.

26. The system of claim 25, wherein the predetermined time interval is configured as a single unit interval (UI), and the calibration data is used to provide timing of the UI to the receiver.

27. The system of claim 25, further comprising:
    clock and data recovery (CDR) circuitry in the receiver including circuitry configured to set a delay generator in the clock and data recovery (CDR) circuitry using the derived calibration data.

28. The system of claim 27, wherein the delay generator includes a half unit interval (UI) generator and the predetermined time period is a single UI, wherein the half UI is determined based on the derived calibration data.

29. The system of claim 25, wherein the calibration data is utilized by the receiver to derive a clock pattern having a cycle of one unit internal (UI), wherein the clock pattern is utilized to correct a duty cycle of a receiver clock within the receiver.

30. The system of claim 25, wherein the 3-line interface is a MIPI C-PHY interface.

* * * * *